US012746824B2

(12) United States Patent
Kanekawa et al.

(10) Patent No.: US 12,746,824 B2
(45) Date of Patent: Sep. 29, 2026

(54) POWER SUPPLY NETWORK, ELECTRIC VEHICLE, AND POWER CONVERSION DEVICE

(71) Applicant: Hitachi Astemo, Ltd., Hitachinaka (JP)

(72) Inventors: Nobuyasu Kanekawa, Tokyo (JP); Hiroshi Nakano, Tokyo (JP); Takao Fukuda, Hitachinaka (JP); Ryoichi Inada, Tokyo (JP); Kentaro Jumonji, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 19/101,648

(22) PCT Filed: Aug. 2, 2023

(86) PCT No.: PCT/JP2023/028299
§ 371 (c)(1),
(2) Date: Feb. 6, 2025

(87) PCT Pub. No.: WO2024/043023
PCT Pub. Date: Feb. 29, 2024

(65) Prior Publication Data

US 2026/0042352 A1 Feb. 12, 2026

(30) Foreign Application Priority Data

Aug. 24, 2022 (JP) ................................ 2022-132969

(51) Int. Cl.
*B60L 3/00* (2019.01)
*B60L 3/04* (2006.01)
(Continued)

(52) U.S. Cl.
CPC ........... *B60L 3/0046* (2013.01); *B60L 3/0092* (2013.01); *B60L 3/04* (2013.01); *B60L 7/16* (2013.01);
(Continued)

(58) Field of Classification Search
CPC ........ B60L 3/0046; B60L 3/0092; B60L 3/04; B60L 7/16; B60L 15/2009;
(Continued)

(56) References Cited

U.S. PATENT DOCUMENTS

2013/0090813 A1 4/2013 Kanekawa et al.
2013/0184937 A1 7/2013 Mukai et al.
(Continued)

FOREIGN PATENT DOCUMENTS

JP 2007-295720 A 11/2007
JP 2013-144499 A 7/2013
(Continued)

OTHER PUBLICATIONS

International Search Report (PCT/ISA/210) issued in PCT Application No. PCT/JP2023/028299 dated Oct. 17, 2023 with English translation (4 pages).

(Continued)

*Primary Examiner* — Regis J Betsch
*Assistant Examiner* — Alex W Lam
(74) *Attorney, Agent, or Firm* — Crowell & Moring LLP

(57) ABSTRACT

The object of the present invention is to achieve redundancy of a power supply function by a simple configuration, to ensure operational continuity in case of failure. A power grid (1) comprises: a first power supply path (20-1) that is connected to a main engine-driving power source (100-0) of a vehicle via a power conversion device (101) and to loads (40-1, 41, 42-1); and a second power supply path (20-2) that is connected to a power source (100-2) different from the main engine-driving power source (100-0), to loads (40-2, 41, 42-2), and to the first power supply path (20-1) via a switch SW0. The switch SW0 is closed when the first power supply path (20-1) and the second power supply path (20-2)
(Continued)

are normal, and is opened when the first power supply path (20-1) or the second power supply path (20-2) is abnormal.

9 Claims, 22 Drawing Sheets

(51) Int. Cl.

| | |
|---|---|
| ***B60L 7/16*** | (2006.01) |
| ***B60L 15/20*** | (2006.01) |
| ***H02J 1/082*** | (2026.01) |
| ***H02J 9/06*** | (2006.01) |
| ***H02J 105/37*** | (2026.01) |

(52) U.S. Cl.
CPC .......... *B60L 15/2009* (2013.01); *H02J 1/082* (2020.01); *H02J 9/061* (2013.01); *B60L 2210/10* (2013.01); *B60L 2210/42* (2013.01); *B60L 2220/46* (2013.01); *B60L 2240/423* (2013.01); *H02J 2105/37* (2026.01)

(58) Field of Classification Search
CPC ............. B60L 2210/10; B60L 2210/42; B60L 2220/46; B60L 2240/423; H02J 1/082; H02J 9/061; H02J 2310/48
See application file for complete search history.

(56) References Cited

U.S. PATENT DOCUMENTS

| | | | | |
|---|---|---|---|---|
| 2019/0252994 | A1* | 8/2019 | Kobayashi | B60L 50/50 |
| 2020/0366168 | A1* | 11/2020 | Abe | H02M 7/53 |
| 2020/0376949 | A1* | 12/2020 | Furukawa | B60L 1/003 |
| 2021/0376627 | A1 | 12/2021 | Sato | |
| 2022/0032866 | A1 | 2/2022 | Murata et al. | |
| 2023/0072786 | A1* | 3/2023 | Morita | B60L 3/0092 |

FOREIGN PATENT DOCUMENTS

| | | | |
|---|---|---|---|
| JP | 2014-193720 | A | 10/2014 |
| JP | 2016-220427 | A | 12/2016 |
| JP | 2018-182864 | A | 11/2018 |
| JP | 2019-41468 | A | 3/2019 |
| JP | 2019-80473 | A | 5/2019 |
| JP | 2020-96447 | A | 6/2020 |
| JP | 2021-136718 | A | 9/2021 |

OTHER PUBLICATIONS

Japanese-language Written Opinion (PCT/ISA/237) issued in PCT Application No. PCT/JP2023/028299 dated Oct. 17, 2023 with English translation (7 pages).
Japanese-language Office Action issued in Japanese Application No. 2022-132969 dated Apr. 23, 2026 (4 pages).
Japanese-language Office Action issued in Japanese Application No. 2022-132969 dated Aug. 4, 2026 (4 pages).

* cited by examiner

POWER SUPPLY NETWORK, ELECTRIC VEHICLE, AND POWER CONVERSION DEVICE

TECHNICAL FIELD

The present invention relates to a power supply network, an electric vehicle, and a power conversion device.

BACKGROUND ART

Since the beginning of this century, the electrification of car auxiliary machine such as electric steering and electric brakes has progressed. Furthermore, in recent years, the electrification of the main machine has also progressed, as typified by hybrid cars and electric cars. In addition, automated driving will also progress, and, car driving will be required to be completed by autonomous and automated operation without human intervention gradually, even in the event of a failure in the future. In light of this, there is a growing demand for higher performance and higher reliability (operation continuity even in the event of a failure) for in-vehicle power supply networks that support the electrification and automation of cars.

For example, PTL 1 discloses a technique for making the control unit redundant as well as the power supply unit redundant and further discloses a technique for operating the control unit in a power-saving mode when the power supply unit fails.

CITATION LIST

Patent Literature

PTL 1: JP 2014-193720 A

SUMMARY OF INVENTION

Technical Problem

However, with the technique disclosed in PTL 1, making the power supply function redundant for operation continuity in the event of a failure leads to a significant increase in costs, and is therefore difficult to implement easily.

The present invention has been made in view of the above and has an object to implement redundancy in the power supply function with a simple configuration and ensure operation continuity in the event of a failure.

Solution to Problem

In order to solve the above problem, a power supply network of the present invention is a power supply network that is mounted on a vehicle and supplies power to a load from a plurality of power supply paths, the power supply network including: a first power supply path connected to a main-machine drive power supply of the vehicle through a power conversion device and connected to the load; and a second power supply path connected to a power source different from the main-machine drive power supply, connected to the load, and connected to the first power supply path through a switch. The switch is closed when the first power supply path and the second power supply path are normal, and is opened when the first power supply path or the second power supply path is abnormal.

Advantageous Effects of Invention

According to the present invention, it is possible to implement redundancy of the power supply function with a simple configuration and ensure operation continuity in the event of a failure.

Problems, configurations, and effects other than those described above will be clarified by the following description of embodiments.

DESCRIPTION OF EMBODIMENTS

Figure 1:
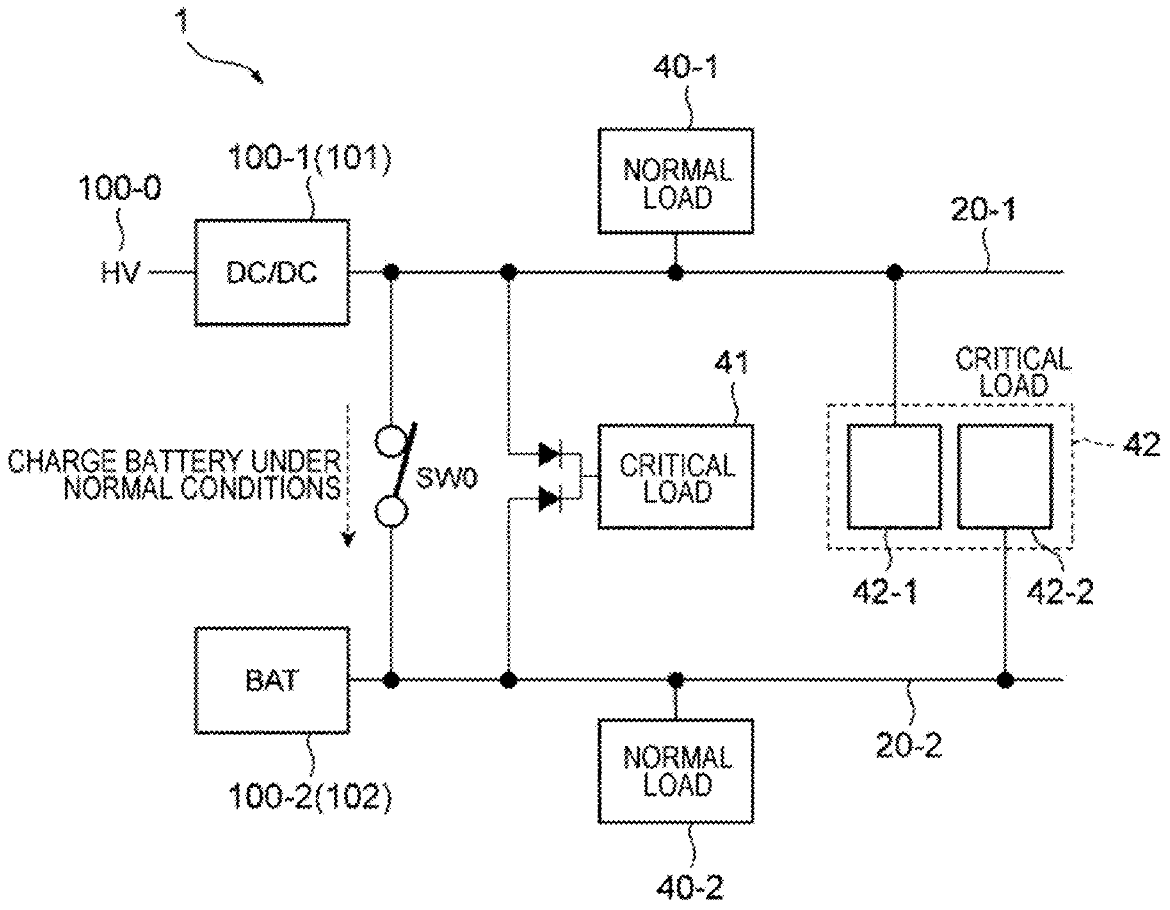
FIG. 1 is a diagram showing a power supply network of the present embodiment.

Hereinafter, embodiments of the present invention will be described with reference to the drawings. It should be noted that components denoted with the same reference numerals in each embodiment have the same functions in each embodiment unless otherwise noted, and description thereof will be omitted.

First Embodiment

Figure 2:
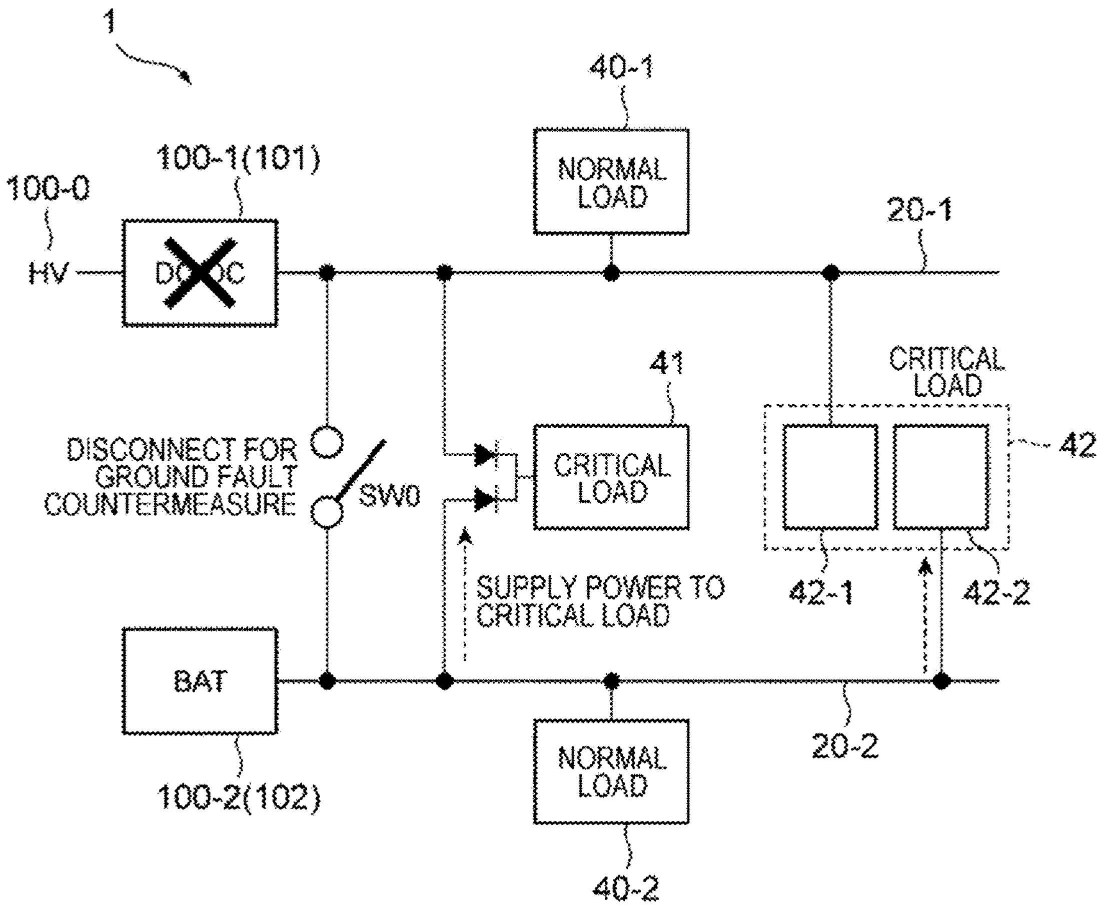
FIG. 2 is a diagram showing an operation example when an abnormality occurs in a power conversion device.
Figure 3:
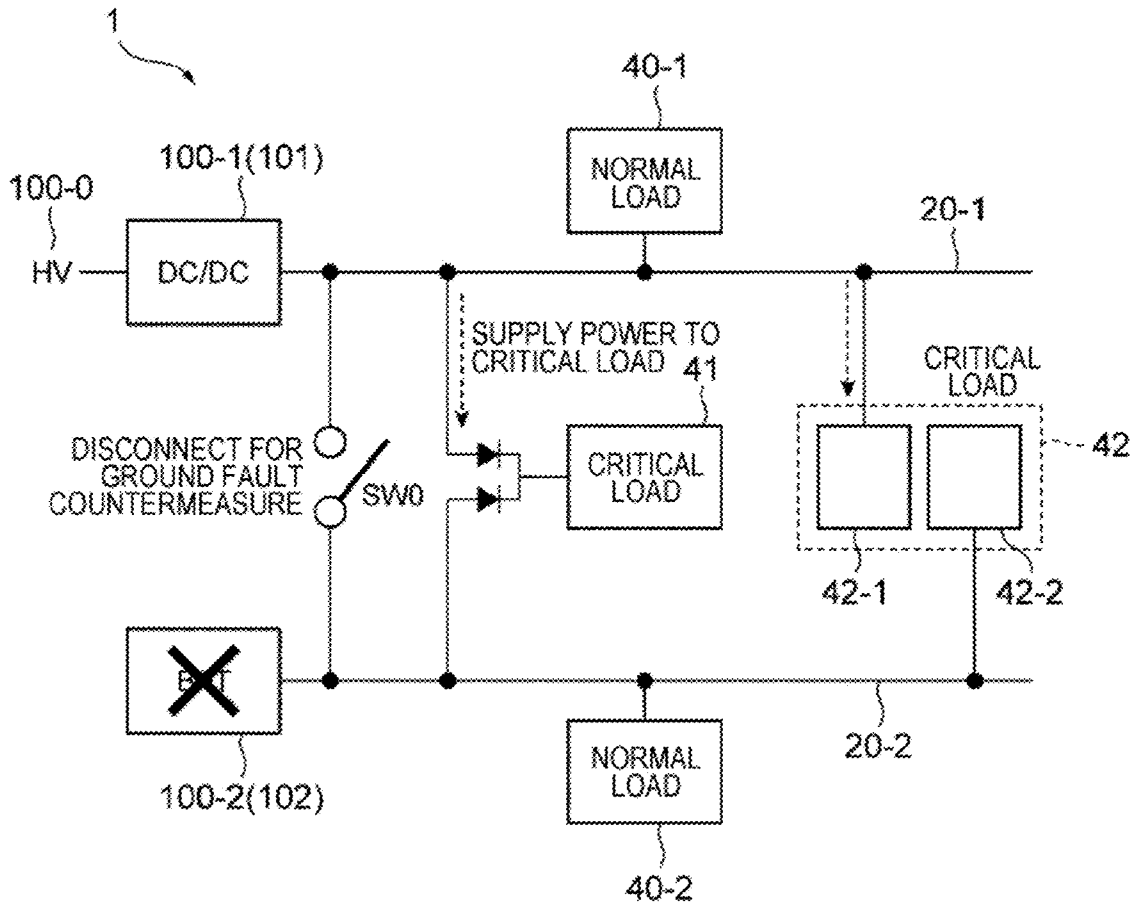
FIG. 3 is a diagram showing an operation example when an abnormality occurs in a secondary battery.

FIG. 1 is a diagram showing a power supply network 1 of the present embodiment. FIG. 2 is a diagram showing an operation example when an abnormality occurs in the power conversion device 101. FIG. 3 is a diagram showing an operation example when an abnormality occurs in the secondary battery 102.

The power supply network 1 is a power supply network that is installed in a vehicle and supplies power to a load from a plurality of power supply paths. In particular, the power supply network 1 is a power supply network installed in an electric vehicle such as a pure electric car (BEV) or a hybrid car (HEV/PHEV). The power supply network 1 includes a first power supply path 20-1 that is connected to the main-machine drive power supply 100-0 of a vehicle through a power conversion device 101 and connected to loads, and a second power supply path 20-2 that is connected to a power source different from the main-machine drive power supply 100-0 and connected to loads and is connected to the first power supply path 20-1 through a switch SW0.

The power conversion device 101 connected to the main-machine drive power supply 100-0 operates as a power source 100-1 that supplies power to the first power supply path 20-1. The second power supply path 20-2 is connected to a power source 100-2 (secondary battery 102) and is further connected to a power source 100-1 (power conversion device 101) through a switch SW0.

In a pure electric car, the main-machine drive power supply 100-0 includes a battery charger and a main-machine drive high-voltage secondary battery that is electrically connected to the battery charger. In a hybrid car, the main-machine drive power supply 100-0 includes an electric motor and generator (hereinafter also referred to as "motor") that is mechanically connected to the engine or drive system, and a main-machine drive high-voltage secondary battery that is electrically connected to the engine or drive system.

Both the first power supply path 20-1 and the second power supply path 20-2 are connected to critical loads 41 and 42. The first power supply path 20-1 and the second power supply path 20-2 are both connected to the critical load 41 through a diode OR. A portion 42-1 of the critical load 42 is connected to the first power supply path 20-1, and the other portion 42-2 of the critical load 42 is connected to the second power supply path 20-2. In addition to the critical loads 41 and 42, a normal load 40-1 may be connected to the first power supply path 20-1, and a normal load 40-2 may be connected to the second power supply path 20-2.

Examples of the critical load 41 include a steering device (specifically, a steering ECU 200-5) and an automated driving control device (specifically, an automated driving (AD) ECU 200-6). Examples of the critical load 42 include loads distributed to multiple wheels, such as brake devices (specifically, electric brake (BK) ECUS 200-7 to 200-*m*+1 or in-wheel motors (IWM) 200'-7 to 200'-*m*+1). Examples of the normal loads 40-1 and 40-2 include loads such as electric windows, air conditioners, navigation devices, and lighting devices.

When the first power supply path 20-1 and the second power supply path 20-2 are normal (no abnormality is detected in either of them), the switch SW0 is closed as shown in FIG. 1. In this case, the first power supply path 20-1 and the second power supply path 20-2 are electrically connected, and the output power of the power source 100-1 (power conversion device 101) on the first power supply path 20-1 is supplied to the second power supply path 20-2 including the power source 100-2 (secondary battery 102) via the switch SW0. At this time, the power source 100-2 (secondary battery 102) is charged by the output power of the power source 100-1 (power conversion device 101).

When the first power supply path 20-1 or the second power supply path 20-2 is abnormal, the switch SW0 is opened as shown in FIG. 2 or FIG. 3. In this case, the first power supply path 20-1 and the second power supply path 20-2 operate as separate power supply paths independent of each other.

For example, as shown in FIG. 2, when an abnormality occurs in the power source 100-1 (power conversion device 101), the first power supply path 20-1 does not operate normally, but power is supplied to the critical load 41 from the second power supply path 20-2 via a diode OR. A portion 42-2 of the critical load 42 is supplied with power from the second power supply path 20-2. Each of the critical loads 41 and 42-2 can continue to operate.

For example, as shown in FIG. 3, when an abnormality occurs in the power source 100-2 (secondary battery 102), the second power supply path 20-2 does not operate normally, but power is supplied to the critical load 41 from the first power supply path 20-1 via a diode OR. A portion 42-1 of the critical load 42 is supplied with power from the first power supply path 20-1. Each of the critical loads 41 and 42-1 can continue to operate.

As described above, in the power supply network 1 of the present embodiment, the power conversion device 101 and the secondary battery 102, which would conventionally be included in one power supply path, are connected to the first power supply path 20-1 and the second power supply path 20-2 through the switch SW0, respectively. This makes it possible for power supply network 1 of the present embodiment to operate as one power supply path under normal conditions and as separate independent power supply paths under abnormal conditions. In other words, the power supply network 1 of the present embodiment can configure the power supply path so as not to simply make the power conversion device 101 and the secondary battery 104 redundant as a power supply function under normal conditions, but to make the power supply function redundant under abnormal conditions. Therefore, the power supply network 1 of the present embodiment can implement redundancy of the power supply function with a simple configuration and ensure operation continuity in the event of a failure.

In particular, in an electric vehicle mounted with the power supply network 1, redundancy of the power supply function can be implemented with a simple configuration, and operation continuity can be ensured in the event of a failure, so that the reliability of the vehicle can be easily improved, and safety can be improved.

It should be noted that in the present embodiment, the abnormality is assumed to be the following failure mode. The power supply network 1 is provided with an ECU and sensors that can detect the following failure modes.

<Abnormality in Power Source>

Overvoltage: The input voltage to the ECU supplied from the power source is higher than a threshold value.

Detection method: Detection is made by the ECU's control function measuring the input voltage to the ECU supplied from the power source.

Voltage drop: The input voltage to the ECU supplied from the power source is lower than a threshold value.

Detection method: Detection is made by the ECU's control function measuring the input voltage to the ECU supplied from the power source.

<Abnormality in Power Source, Power Supply Path, or ECU>

Overcurrent: The output current from the ECU flowing through the load is greater than a threshold value.

Detection method: Detection is made by the ECU's current sensor measuring the output current from the ECU that flows through the load. Alternatively, detection is made by the ECU's control function measuring the output voltage to the load (the output voltage is lower than a threshold value). In this case, by using a resistor to pull up the ECU's output terminal that leads to the load, it is possible to detect whether the load state has been restored even when the power is cut off.

Overheating: The apparatus temperature is higher than a threshold value.

Detection method: Detection is made by a temperature sensor. Alternatively, estimation is made based on the current value measured by a current sensor.

Second Embodiment

Figure 4:
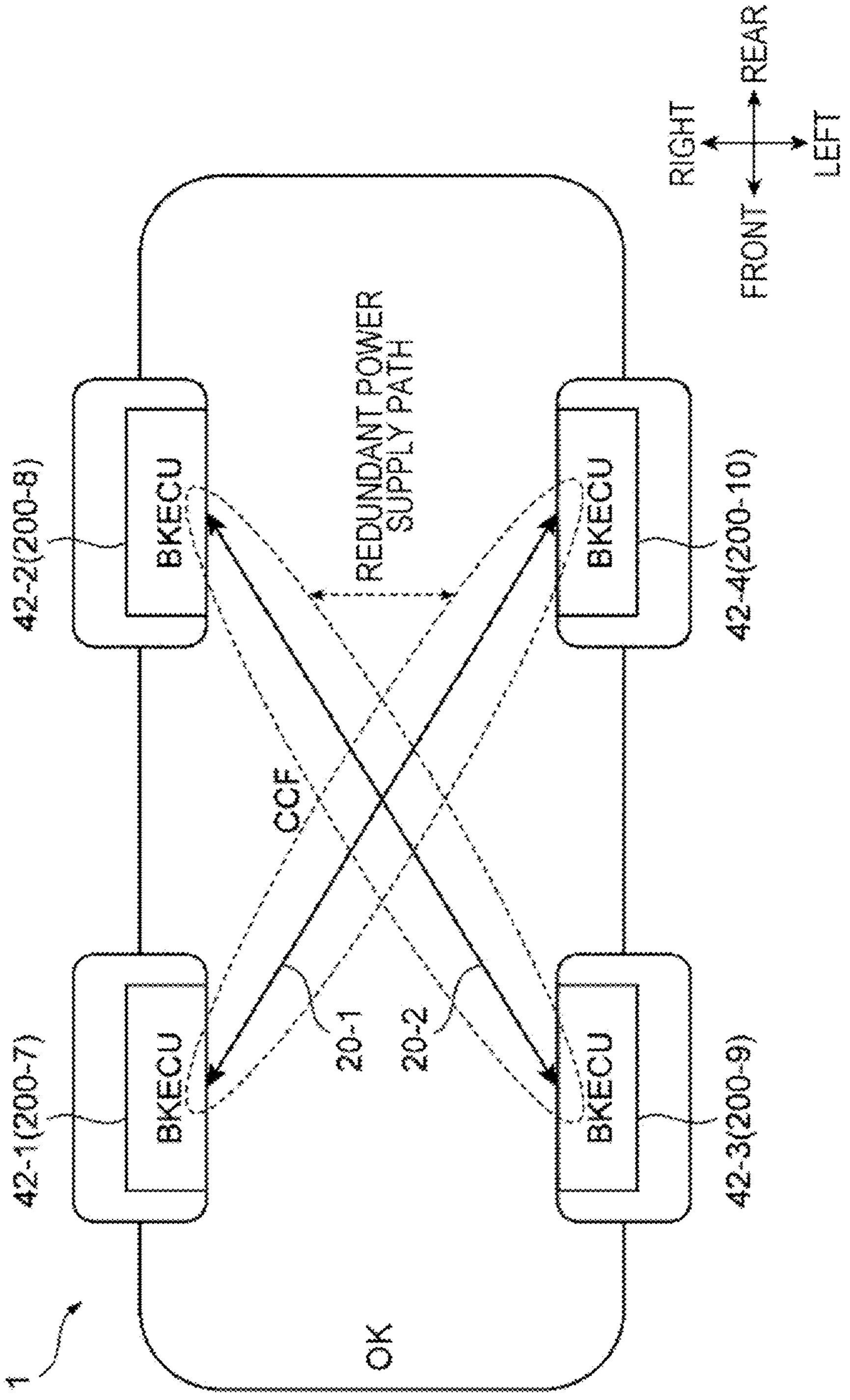
FIG. 4 is a diagram showing a connection example of a first power supply path and a second power supply path to brake devices.
Figure 5:
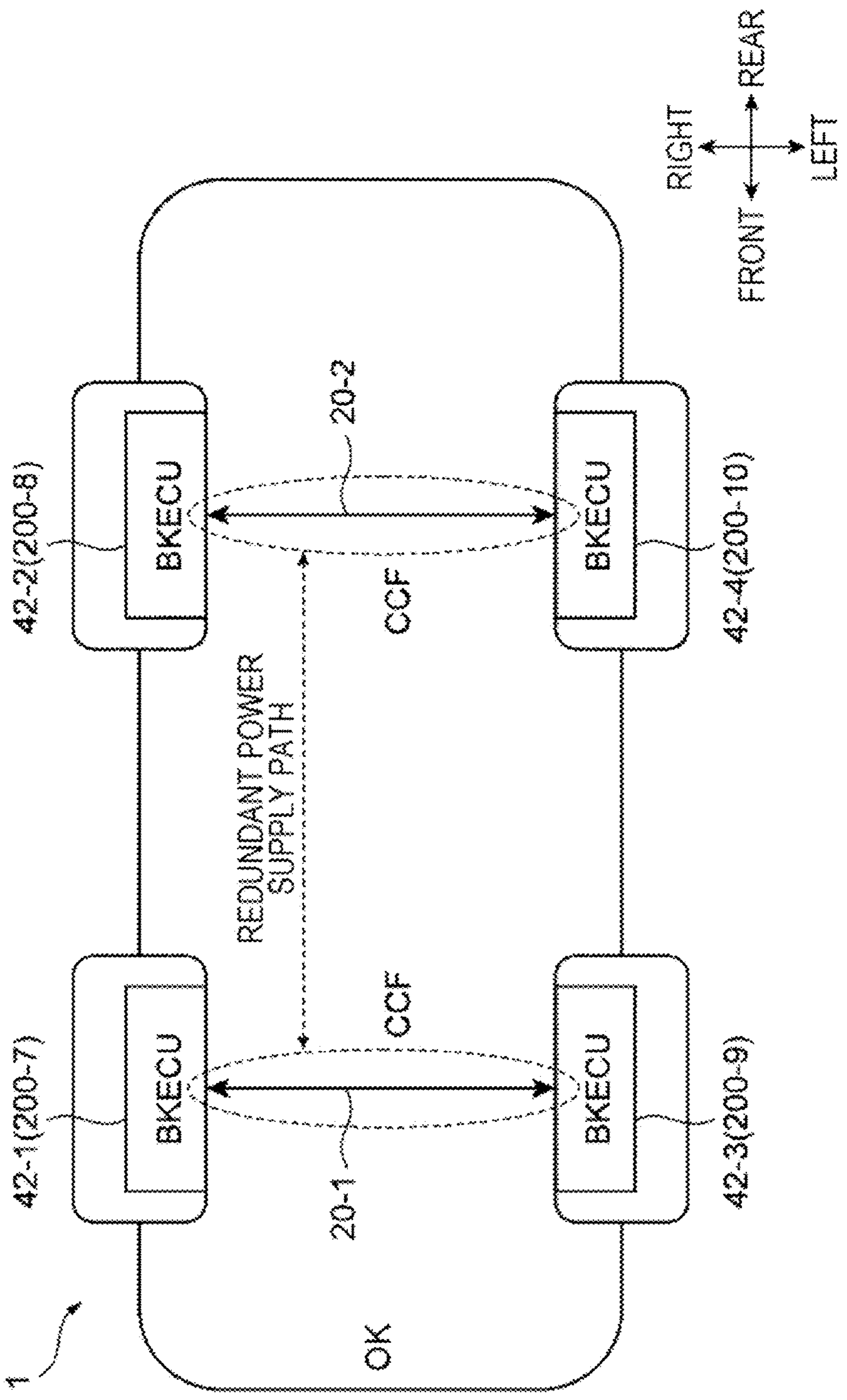
FIG. 5 is a diagram showing a connection example of the first power supply path and the second power supply path to the brake devices.
Figure 6:
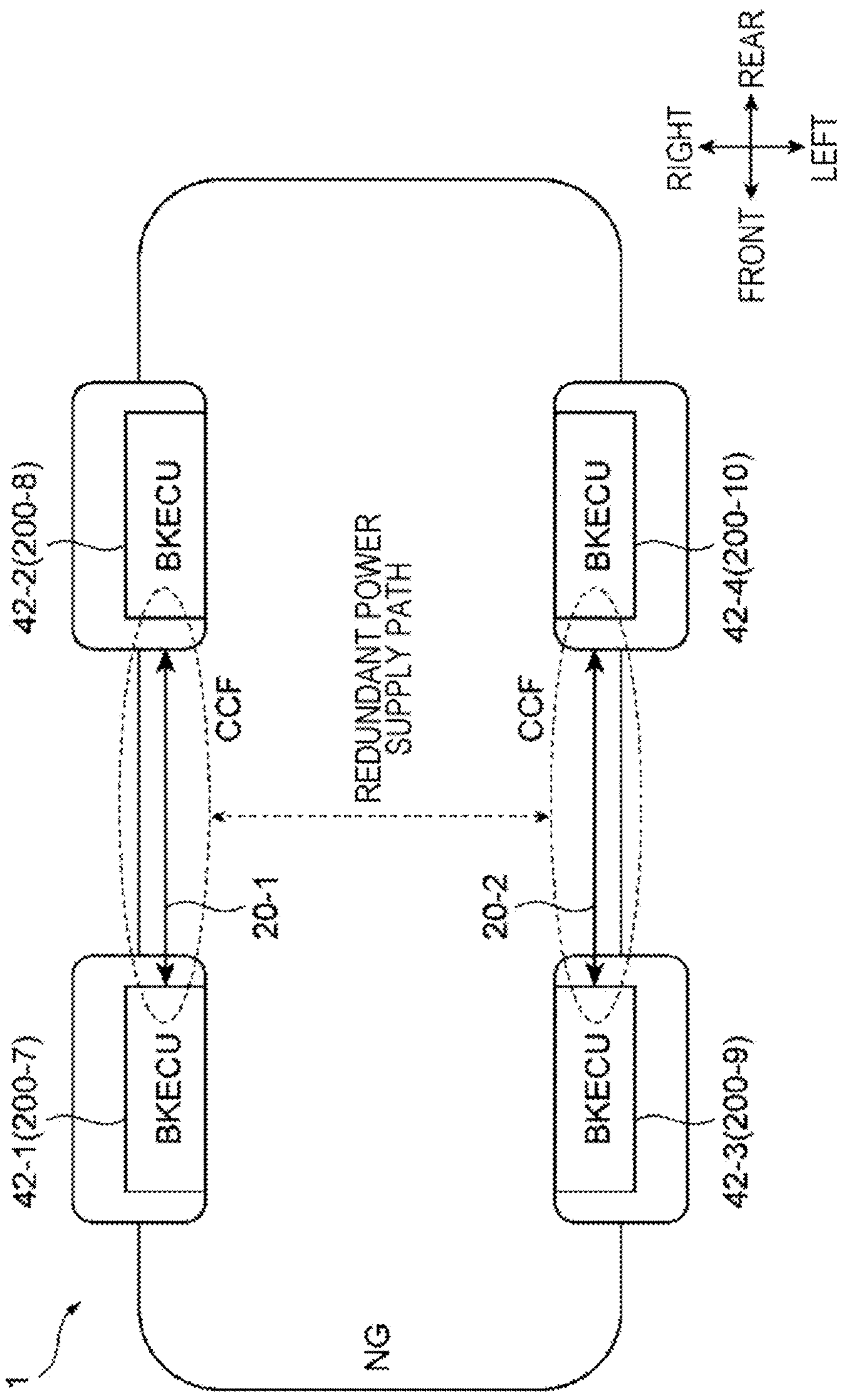
FIG. 6 is a diagram showing an undesirable connection example of the first power supply path and the second power supply path to the brake devices.

FIG. 4 is a diagram showing a connection example of a first power supply path 20-1 and a second power supply path 20-2 to the brake devices. FIG. 5 is a diagram showing a connection example of a first power supply path 20-1 and a second power supply path 20-2 to the brake devices. FIG. 6 is a diagram showing an undesirable connection example of a first power supply path 20-1 and a second power supply path 20-2 to the brake devices.

When the first power supply path 20-1 and the second power supply path 20-2 are connected to the brake devices, consideration needs to be given to prevent a common cause failure (CCF) with a failure of these power supply paths as a common cause from occurring in the brake devices. Failure of the brake devices includes a failure mode in which no braking force can be generated. Furthermore, failure of the brake devices includes a failure mode in which braking force can be generated only on the right or left wheels, but not on the opposite wheel, that is, a failure mode in which what is called "one-sided braking" occurs.

FIG. 4 shows a case where duplicated power supply paths are connected to the electric brake ECUs on diagonally opposite wheels. Specifically, the first power supply path 20-1 is connected to the right front electric brake ECU 200-7 (critical load 42-1) and the left rear electric brake ECU 200-10 (critical load 42-4). The second power supply path 20-2 is connected to the left front electric brake ECU 200-9 (critical load 42-3) and the right rear electric brake ECU 200-8 (critical load 42-2).

According to the connection example in FIG. 4, when a failure occurs in the first power supply path 20-1 and the power supply is disabled, the right front electric brake ECU 200-7 (critical load 42-1) and the left rear electric brake ECU 200-10 (critical load 42-4) will not operate, and braking force cannot be generated. However, when the second power supply path 20-2 is normal, the left front electric brake ECU 200-9 (critical load 42-3) and the right rear electric brake ECU 200-8 (critical load 42-2) operate normally, so that "one-sided braking" does not occur. In addition, similarly, when a failure occurs in the second power supply path 20-2 and the power supply is disabled, the left front electric brake ECU 200-9 (critical load 42-3) and the right rear electric brake ECU 200-8 (critical load 42-2) will not operate, and braking force cannot be generated. However, when the first power supply path 20-1 is normal, the right front electric brake ECU 200-7 (critical load 42-1) and the left rear electric brake ECU 200-10 (critical load 42-4) operate normally, so that "one-sided braking" does not occur.

FIG. 5 shows a case where duplicated respective power supply paths are connected to the electric brake ECU of the wheels on both the left and right sides of the front and rear wheels. Specifically, the first power supply path 20-1 is connected to the right front electric brake ECU 200-7 (critical load 42-1) and the left front electric brake ECU 200-9 (critical load 42-3). The second power supply path 20-2 is connected to the right rear electric brake ECU 200-8 (critical load 42-2) and the left rear electric brake ECU 200-10 (critical load 42-4).

According to the connection example in FIG. 5, when a failure occurs in the first power supply path 20-1 and the power supply is disabled, the right front electric brake ECU 200-7 (critical load 42-1) and the left front electric brake ECU 200-9 (critical load 42-3) will not operate, and braking force cannot be generated. However, when the second power supply path 20-2 is normal, the right rear electric brake ECU 200-8 (critical load 42-2) and the left rear electric brake ECU 200-10 (critical load 42-4) operate normally, so that "one-sided braking" does not occur. In addition, similarly, when a failure occurs in the second power supply path 20-2 and the power supply is disabled, the right rear electric brake ECU 200-8 (critical load 42-2) and the left rear electric brake ECU 200-10 (critical load 42-4) will not operate, and braking force cannot be generated. However, when the first power supply path 20-1 is normal, the right front electric brake ECU 200-7 (critical load 42-1) and the left front electric brake ECU 200-9 (critical load 42-3) operate normally, so that "one-sided braking" does not occur.

FIG. 6 shows a case where duplicated respective power supply paths are connected to the electric brake ECUs on the right and left sides. Specifically, the first power supply path 20-1 is connected to the right front electric brake ECU 200-7 (critical load 42-1) and the right rear electric brake ECU 200-8 (critical load 42-2). The second power supply path 20-2 is connected to the left front electric brake ECU 200-9 (critical load 42-3) and the left rear electric brake ECU 200-10 (critical load 42-4).

According to the connection example in FIG. 6, when a failure occurs in the first power supply path 20-1 and the power supply is disabled, the right front electric brake ECU 200-7 (critical load 42-1) and the right rear electric brake ECU 200-8 (critical load 42-2) will not operate, so that "one-sided braking" will occur in which the right wheels cannot generate braking force. In addition, similarly, when a failure occurs in the second power supply path 20-2 and the power supply is disabled, the left front electric brake ECU 200-9 (critical load 42-3) and the left rear electric brake ECU 200-10 (critical load 42-4) will not operate, so that "one-sided braking" will occur in which the left wheels cannot generate braking force. That is, as shown in FIG. 6, when the redundant power supply paths 20-1 and 20-2 are connected to only the electric brake ECUs of either the left or right wheels, a failure in either the power supply path 20-1 or 20-2 will cause a "one-sided braking" to occur.

As described above, in the power supply network 1 of the second embodiment, as shown in FIGS. 4 and 5, each of the first power supply path 20-1 and the second power supply path 20-2 is connected to at least one brake device for a right wheel of the vehicle and at least one brake device for a left wheel of the vehicle. Accordingly, even when either the first power supply path 20-1 or the second power supply path 20-2 fails, the power supply network 1 of the second embodiment can prevent the occurrence of "one-sided braking", and therefore can continue braking operation. Therefore, the power supply network 1 of the second embodiment can implement redundancy of the power supply function with a simple configuration and ensure operation continuity in the event of a failure.

It should be noted that in the connection example shown in FIG. 5, since a greater load is applied to the front wheels than to the rear wheels during braking, it is conceivable that a greater braking force needs to be generated. For this reason, the power supply voltage of the first power supply path 20-1 may be made higher than the power supply voltage of the second power supply path 20-2. For example, the second power supply path 20-2 may be 12 V, and the first power supply path 20-1 may be 24/36/48 V. This allows the front wheels to generate a greater braking force with a faster rise.

In addition, as will be described below in the seventh embodiment shown in FIG. 14, it is also possible to supply power to the right front electric brake ECU 200-7 (critical load 42-1) and the left front electric brake ECU 200-9 (critical load 42-3) from the first power supply path 20-1 and the second power supply path 20-2 through the diodes OR. Accordingly, even when a failure occurs in either the first power supply path 20-1 or the second power supply path 20-2, it is possible to reliably operate the right front electric brake ECU 200-7 (critical load 42-1) and the left front electric brake ECU 200-9 (critical load 42-3) which are provided on the front wheels that are applied with a larger load than the rear wheels.

Figure 7:
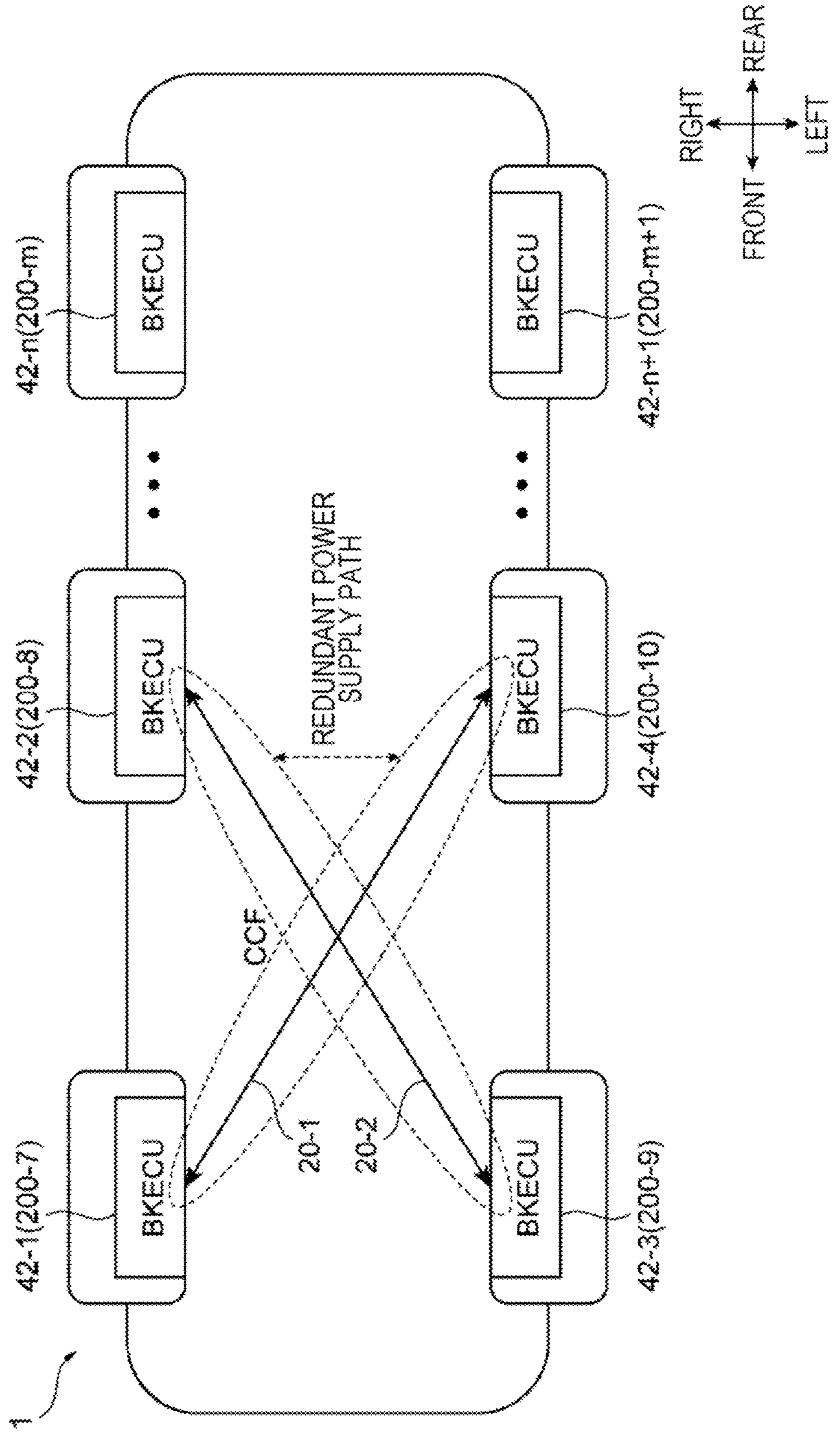
FIG. 7 is a diagram showing a connection example of the first power supply path and the second power supply path to the brake devices mounted on a vehicle having more than four wheels.
Figure 8:
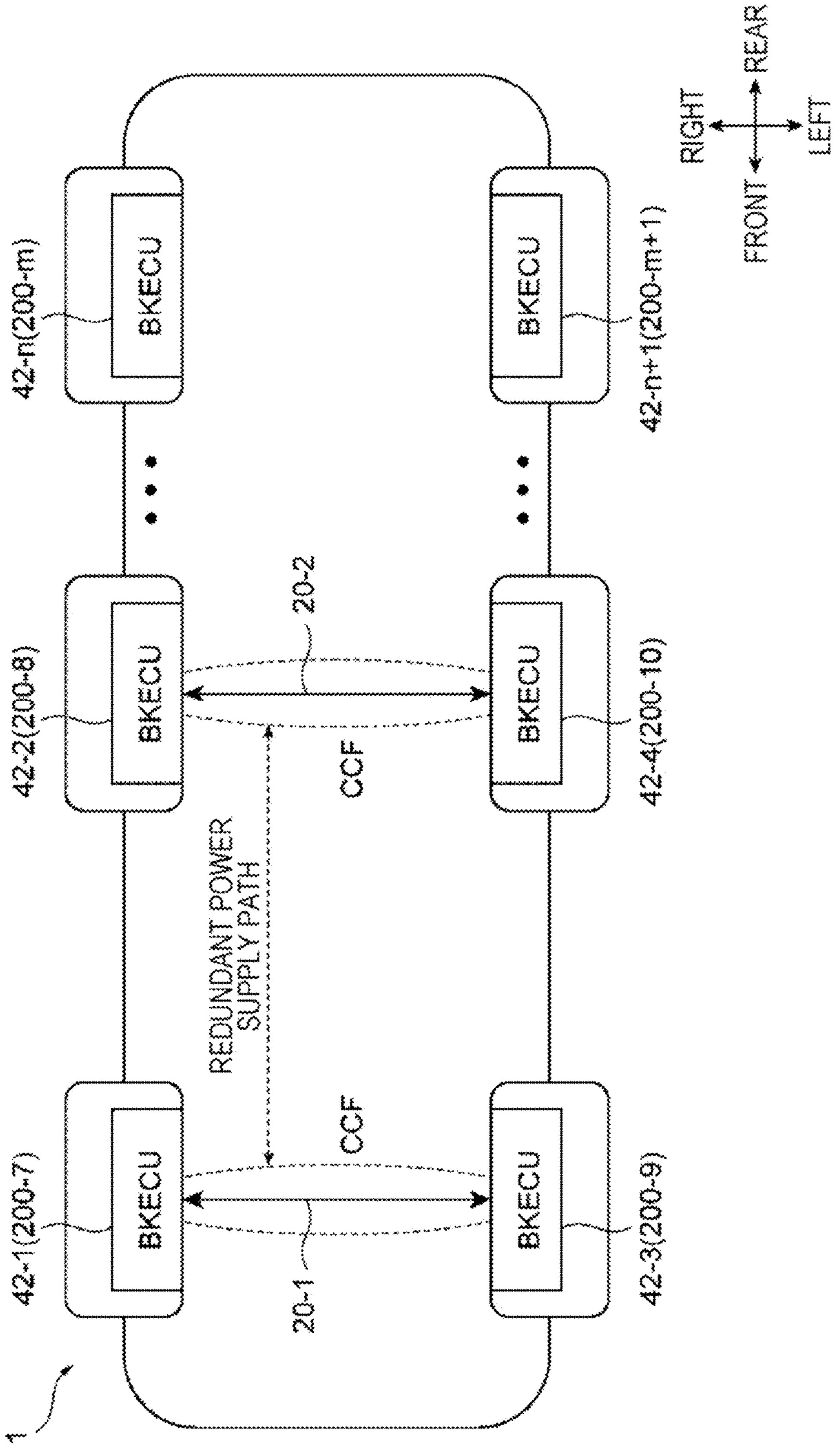
FIG. 8 is a diagram showing a connection example of the first power supply path and the second power supply path to the brake devices mounted on a vehicle having more than four wheels.

FIG. 7 is a diagram showing a connection example of the first power supply path 20-1 and the second power supply path 20-2 to the brake devices mounted on a vehicle having more than four wheels. FIG. 8 is a diagram showing a connection example of the first power supply path 20-1 and the second power supply path 20-2 to the brake devices mounted on a vehicle having more than four wheels.

Even in the cases shown in FIGS. 7 and 8, the method for connecting the power supply paths to the electric brake ECUs as shown in FIGS. 4 and 5 only needs to be adopted for at least four of all wheels. That is, when the redundant power supply paths 20-1 and 20-2 are always connected to the electric brake ECU of at least one wheel on both right and left sides (optimally half of all wheels), a failure in either the power supply path 20-1 or 20-2 will not cause "one-sided braking" to occur.

Third Embodiment

Figure 9:
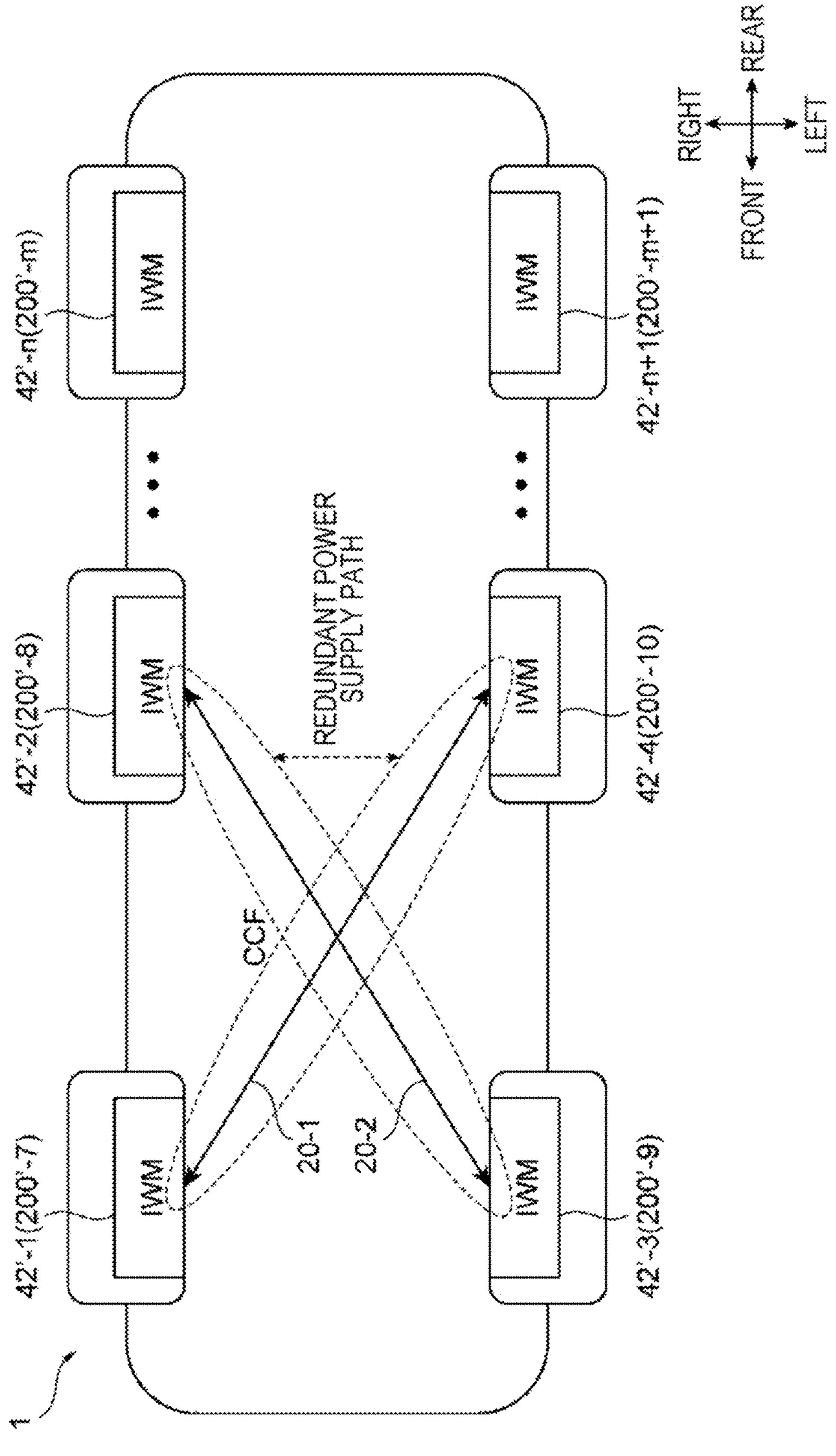
FIG. 9 is a diagram showing a connection example of the first power supply path and the second power supply path to in-wheel motors.
Figure 10:
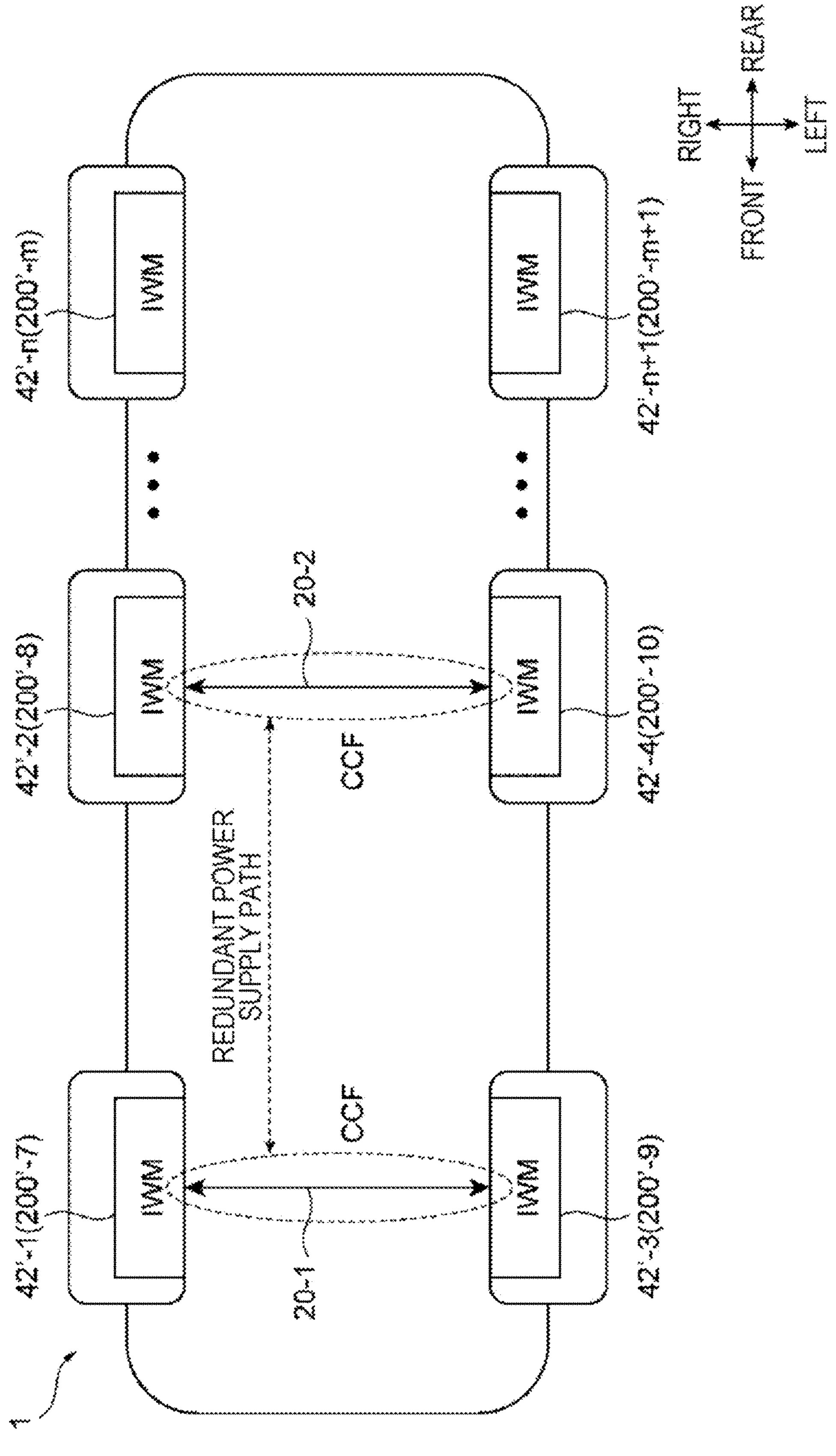
FIG. 10 is a diagram showing a connection example of the first power supply path and the second power supply path to the in-wheel motors.

FIG. 9 is a diagram showing a connection example of the first power supply path 20-1 and the second power supply path 20-2 to in-wheel motors. FIG. 10 is a diagram showing a connection example of the first power supply path 20-1 and the second power supply path 20-2 to in-wheel motors.

The in-wheel motor is an electric motor installed inside the wheel hub used in an electric car or the like. The in-wheel motor is also referred to as a wheel motor, a hub motor, or a power wheel. The in-wheel motor does not necessarily need to have the motor part inside the wheel, and as long as the motor is integrally and coaxially connected to the hub, the motor can be considered as an in-wheel motor. In the in-wheel motor, a motor, an inverter, and a brake can also be integrally mounted inside the wheel.

When the first power supply path 20-1 and the second power supply path 20-2 are connected to an electric drive system including in-wheel motors, consideration needs to be given to prevent a common cause failure (CFF) with a failure of these power supply paths as a common cause from occurring in the electric drive system. A failure in an electric drive system includes a failure mode in which driving force or regenerative braking force cannot be generated at all. Furthermore, a failure in an electric drive system includes a failure mode in which only the right or left wheels can generate driving force or regenerative braking force, but the wheels on the opposite side cannot generate driving force or regenerative braking force, that is, a failure mode in which what is called "one-sided braking" occurs.

Also in the cases shown in FIGS. 9 and 10, the same connection method as the method for connecting the power supply paths to the electric brake ECUs as shown in FIGS. 4 and 5 only needs to be adopted for at least four of all wheels. That is, when the redundant power supply paths 20-1 and 20-2 are always connected to the in-wheel motor of at least one wheel on both right and left sides (optimally half of all wheels), a failure in either the power supply path 20-1 or 20-2 will not cause "one-sided braking" to occur.

As described above, in the power supply network 1 of the third embodiment, each of the first power supply path 20-1 and the second power supply path 20-2 is connected to at least one in-wheel motor for a right wheel of the vehicle and at least one in-wheel motor for a left wheel of the vehicle. Accordingly, the power supply network 1 of the third embodiment can prevent the occurrence of "one-sided braking" even when either the first power supply path 20-1 or the second power supply path 20-2 fails. Furthermore, in the power supply network 1 of the third embodiment, even when either the first power supply path 20-1 or the second power supply path 20-2 fails, a difference in the driving and braking torques of the left and right wheels (specifically, the torque of the outer wheel is made larger than the torque of the inner wheel) can be made to facilitate turning. This means that even when the steering further fails, it is possible to turn by the in-wheel. Therefore, the power supply network 1 of the third embodiment can continue the braking operation and the steering operation even when either the first power supply path 20-1 or the second power supply path 20-2 fails. Therefore, the power supply network 1 of the third embodiment can implement redundancy of the power supply function with a simple configuration and ensure operation continuity in the event of a failure.

It should be noted that as will be described below in the twelfth embodiment shown in FIG. 22, in the event of a failure of the auxiliary-machine drive power supply, it is also possible to utilize some of the in-wheel motors as backup power sources.

Fourth Embodiment

Figure 11:
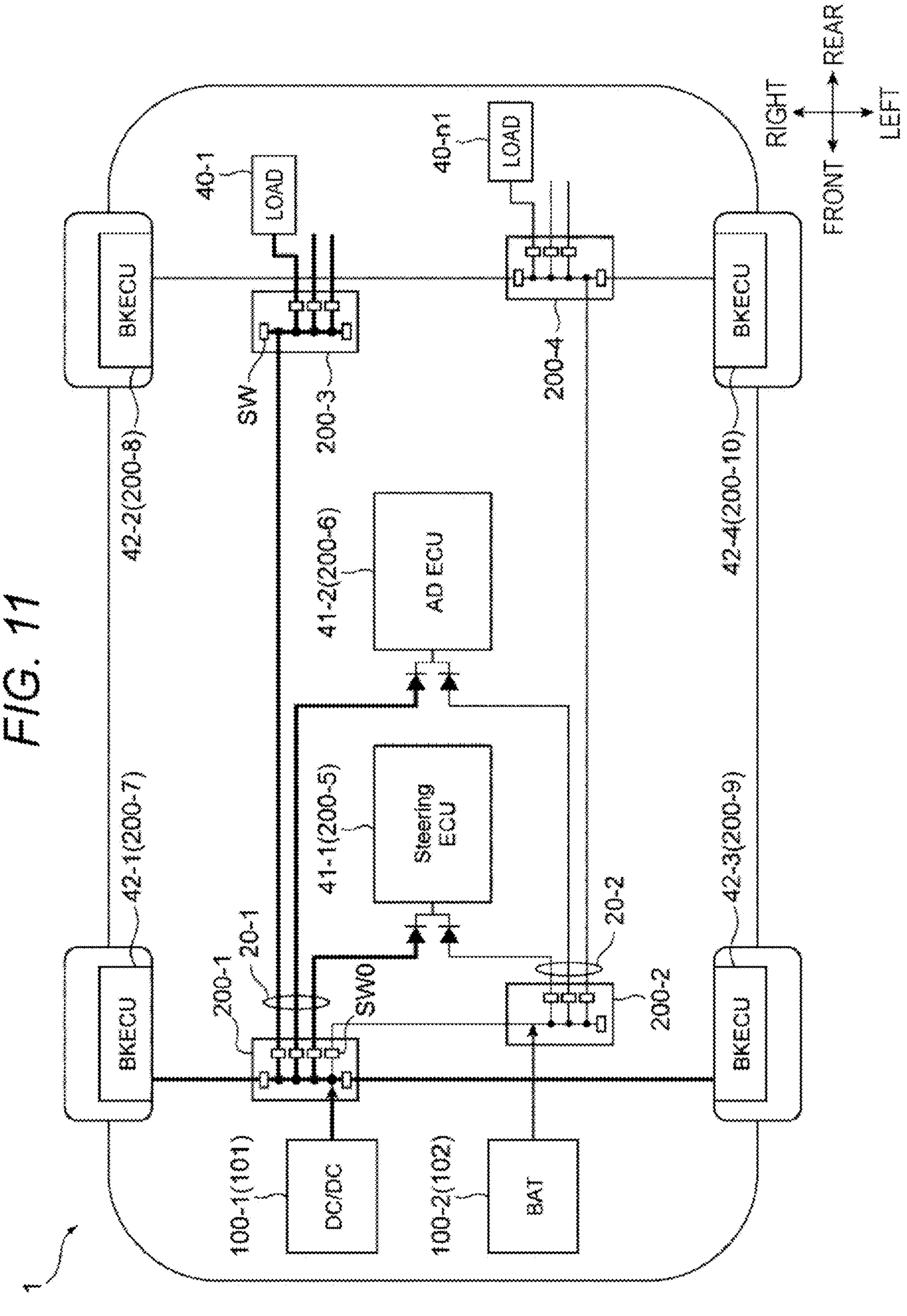
FIG. 11 is a diagram showing a power supply network that is suitable when the number of loads at the rear of the vehicle is large.

FIG. 11 is a diagram showing a power supply network 1 that is suitable when the number of loads at the rear of the vehicle is large.

The output power of a power source 100-1 (power conversion device 101) is supplied to a first power supply path 20-1 via an ECU 200-1. The first power supply path 20-1 is connected to a steering device (steering ECU 200-5) that is a critical load 41-1 and an automated driving control device (automated driving ECU 200-6) that is a critical load 41-2 through diodes OR. Furthermore, the first power supply path 20-1 is connected to a right front electric brake ECU 200-7 that is a critical load 42-1, and a left front electric brake ECU 200-9 that is a critical load 42-3. Furthermore, the first power supply path 20-1 is connected to a load 40-1 at the rear of the vehicle through an ECU 200-3. Furthermore, the first power supply path 20-1 is connected to a second power supply path 20-2 through a switch SW0 in the ECU 200-1.

The second power supply path 20-2 is connected to the power source 100-2 (secondary battery 102) via the ECU 200-2. Furthermore, the second power supply path 20-2 is connected to a right rear electric brake ECU 200-8 that is a critical load 42-2, and a left rear electric brake ECU 200-10 that is a critical load 42-4, through an ECU 200-4. Furthermore, the second power supply path 20-2 is connected to a load **40-*n*1 at the rear of the vehicle through the ECU 200-4**.

When the first power supply path 20-1 and the second power supply path 20-2 are normal, the switch SW0 is closed as in FIG. 1. The output power of the power source 100-1 (power conversion device 101) on the first power supply path 20-1 is supplied to the second power supply path 20-2 including the power source 100-2 (secondary battery 102) via the switch SW0. The power source 100-2 (secondary battery 102) is charged by the output power of the power source 100-1 (power conversion device 101).

When the first power supply path 20-1 or the second power supply path 20-2 is abnormal, the switch SW0 is opened as in FIG. 2 and FIG. 3. The first power supply path 20-1 and the second power supply path 20-2 operate as separate power supply paths independent of each other.

As described above, in the power supply network 1 of the fourth embodiment, the first power supply path 20-1 and the second power supply path 20-2 are each connected to the steering device of the vehicle. Accordingly, the power supply network 1 of the fourth embodiment can continue the steering operation even when either the first power supply path 20-1 or the second power supply path 20-2 fails. Furthermore, in the power supply network 1 of the fourth embodiment, the first power supply path 20-1 and the second power supply path 20-2 are each connected an automated driving control device of the vehicle. Accordingly, the power supply network 1 of the fourth embodiment can continue the control operation of automated driving even when either the first power supply path 20-1 or the second power supply path 20-2 fails. Therefore, the power supply network 1 of the fourth embodiment can implement redundancy of the power supply function with a simple configuration and ensure operation continuity in the event of a failure.

Fifth Embodiment

Figure 12:
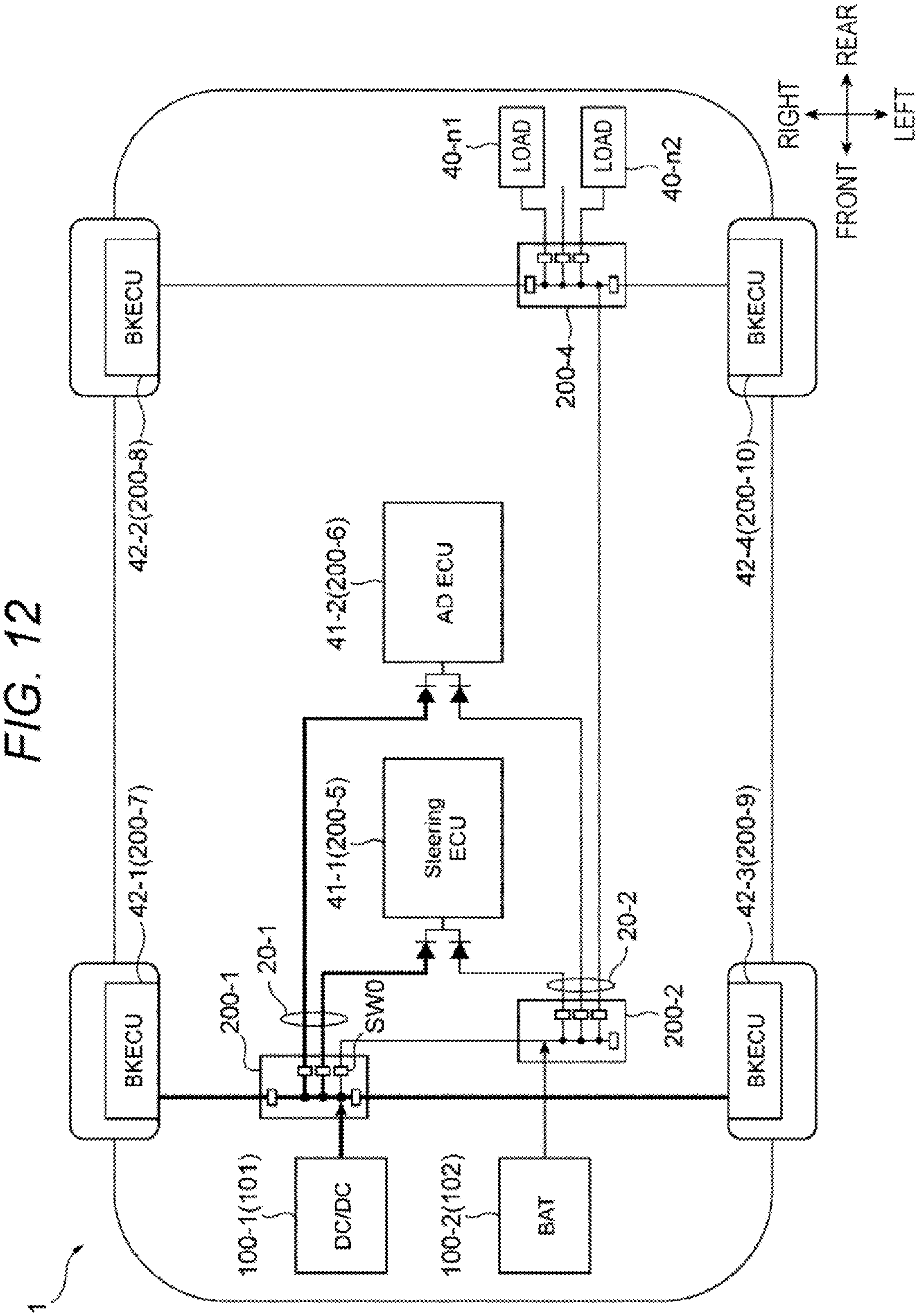
FIG. 12 is a diagram showing a power supply network that is suitable when the number of loads at the rear of the vehicle is small.

FIG. 12 is a diagram showing a power supply network 1 that is suitable when the number of loads at the rear of the vehicle is small.

In the fourth embodiment shown in FIG. 11, since there are a large number of loads at the rear of the vehicle, the loads 40-1 to **40-*n*1 at the rear of the vehicle are connected to the ECU 200-3 and the ECU 200-4. In the fifth embodiment shown in FIG. 12, since there are a small number of loads at the rear of the vehicle are small, the loads 40-1 to 40-*n*2 (n1>n2) at the rear of the vehicle are connected to only the ECU 200-4. The rest is the same as that of the fourth embodiment shown in FIG. 11**.

In the power supply network 1 of the fifth embodiment, since the ECU 200-3 can be omitted in a relatively small vehicle with a small number of loads at the rear of the vehicle, the number of ECUs that control power distribution can be reduced. This enables costs to be reduced according to the vehicle class. It should be noted that it is desirable to install the ECU 200-4 at the rear of the vehicle in the central portion rather than in the left portion of the rear of the vehicle.

Sixth Embodiment

Figure 13:
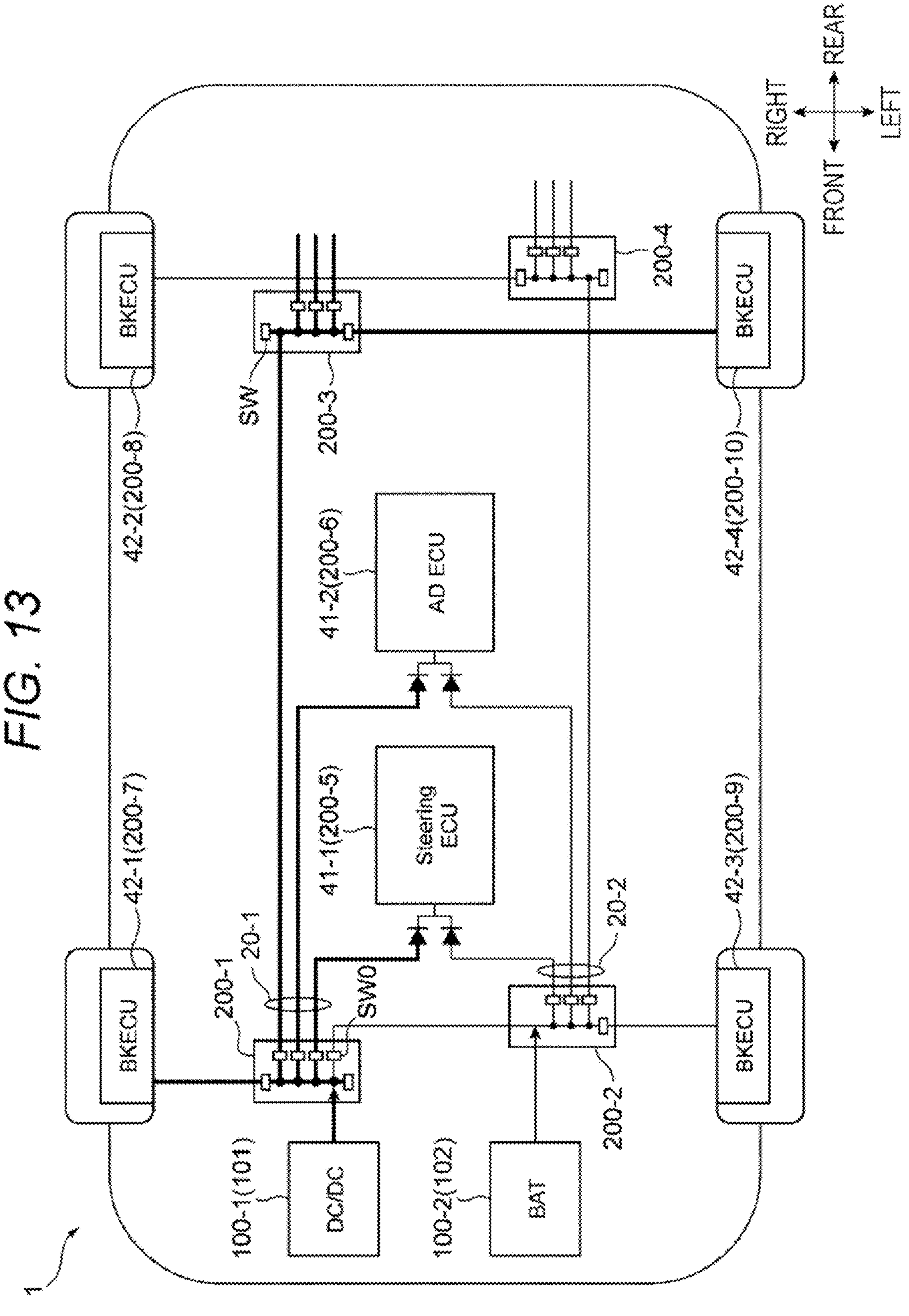
FIG. 13 is a diagram showing a power supply network in which duplicated power supply paths are connected to the brake devices on diagonally opposite wheels.

FIG. 13 is a diagram showing a power supply network 1 in which duplicated power supply paths are connected to the brake devices on diagonally opposite wheels.

The first power supply path 20-1 is connected to the right front electric brake ECU 200-7 (critical load 42-1) via the ECU 200-1 and to the left rear electric brake ECU 200-10 (critical load 42-4) via the ECU 200-3. The second power supply path 20-2 is connected to the left front electric brake ECU 200-9 (critical load 42-3) via the ECU 200-2 and to the right rear electric brake ECU 200-8 (critical load 42-2) via the ECU 200-4.

In the power supply network 1 of the sixth embodiment, as in the second embodiment shown in FIG. 4, when a failure occurs in the first power supply path 20-1 and the power supply is disabled, the right front electric brake ECU 200-7 (critical load 42-1) and the left rear electric brake ECU 200-10 (critical load 42-4) will not operate, and braking force cannot be generated. However, when the second power supply path 20-2 is normal, the left front electric brake ECU 200-9 (critical load 42-3) and the right rear electric brake ECU 200-8 (critical load 42-2) operate normally, so that "one-sided braking" does not occur. In addition, similarly, when a failure occurs in the second power supply path 20-2 and the power supply is disabled, the left front electric brake ECU 200-9 (critical load 42-3) and the right rear electric brake ECU 200-8 (critical load 42-2) will not operate, and braking force cannot be generated. However, when the first power supply path 20-1 is normal, the right front electric brake ECU 200-7 (critical load 42-1) and the left rear electric brake ECU 200-10 (critical load 42-4) operate normally, so that "one-sided braking" does not occur.

Therefore, in the power supply network 1 of the sixth embodiment, as in the second embodiment shown in FIG. 4, even when either the first power supply path 20-1 or the second power supply path 20-2 fails, the power supply network 1 of the second embodiment can prevent the occurrence of "one-sided braking", and therefore can continue braking operation. Therefore, the power supply network 1 of the sixth embodiment can implement redundancy of the power supply function with a simple configuration and ensure operation continuity in the event of a failure.

Seventh Embodiment

Figure 14:
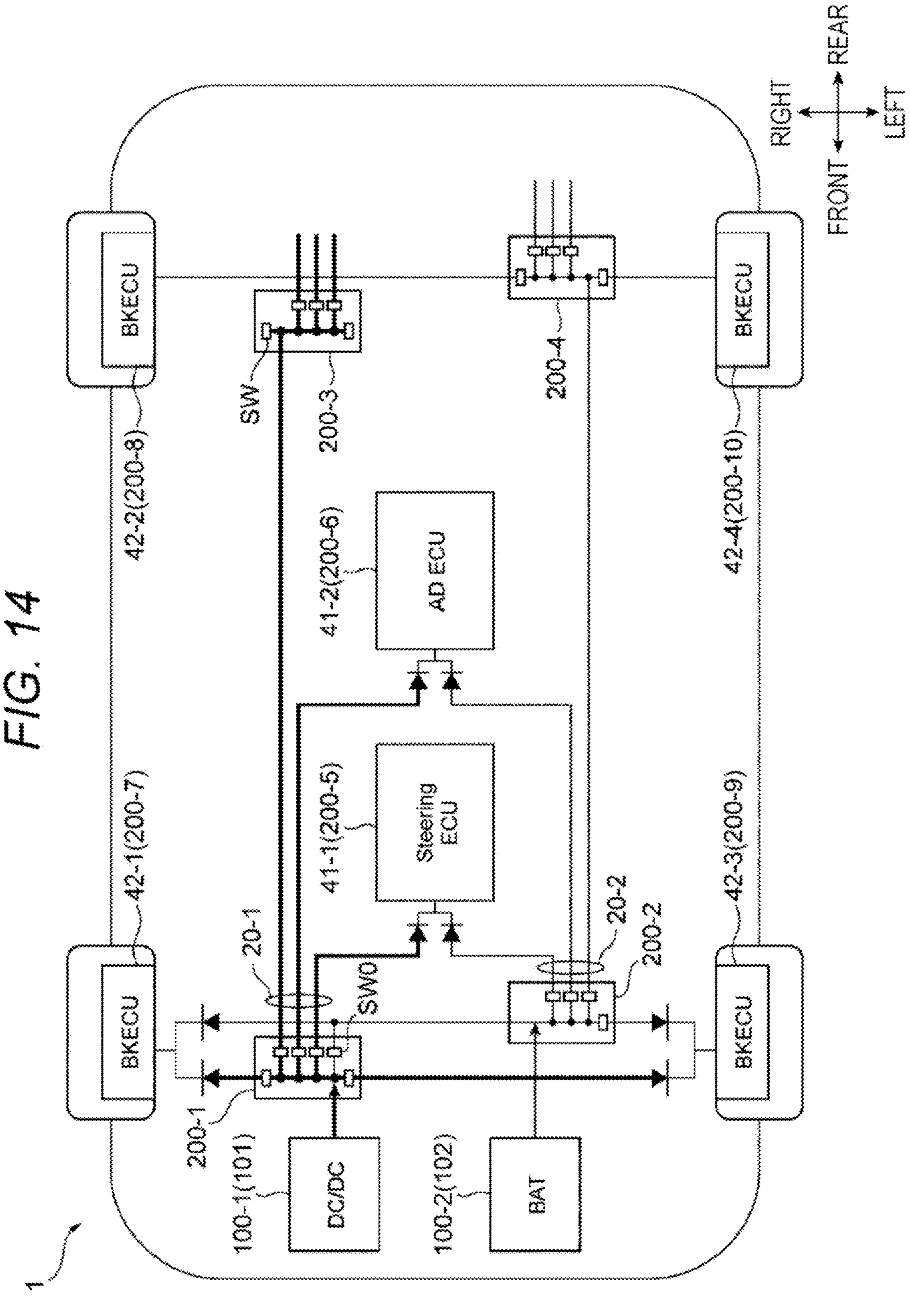
FIG. 14 is a diagram showing a power supply network duplicated by using diodes to strengthen the power supply to the front-wheel brake devices.

FIG. 14 is a diagram showing a power supply network 1 duplicated by using diodes to strengthen the power supply to the front-wheel brake devices.

The right front electric brake ECU 200-7 (critical load 42-1) is connected to the first power supply path 20-1 and the second power supply path 20-2 through diodes OR. The left front electric brake ECU 200-9 (critical load 42-3) is connected to the first power supply path 20-1 and the second power supply path 20-2 through diodes OR. The right front electric brake ECU 200-7 (critical load 42-1) and the left front electric brake ECU 200-9 (critical load 42-3) are each supplied with power from the first power supply path 20-1 via the ECU 200-1 and from the second power supply path 20-2 via the ECU 200-2.

Accordingly, in the power supply network 1 of the seventh embodiment, even when a failure occurs in either the first power supply path 20-1 or the second power supply path 20-2, it is possible to reliably operate the right front electric brake ECU 200-7 (critical load 42-1) and the left front electric brake ECU 200-9 (critical load 42-3) which are provided on the front wheels that are applied with a larger load than the rear wheels. Therefore, the power supply network 1 of the seventh embodiment can implement redundancy of the power supply function with a simple configuration and ensure operation continuity in the event of a failure.

Eighth Embodiment

Figure 15:
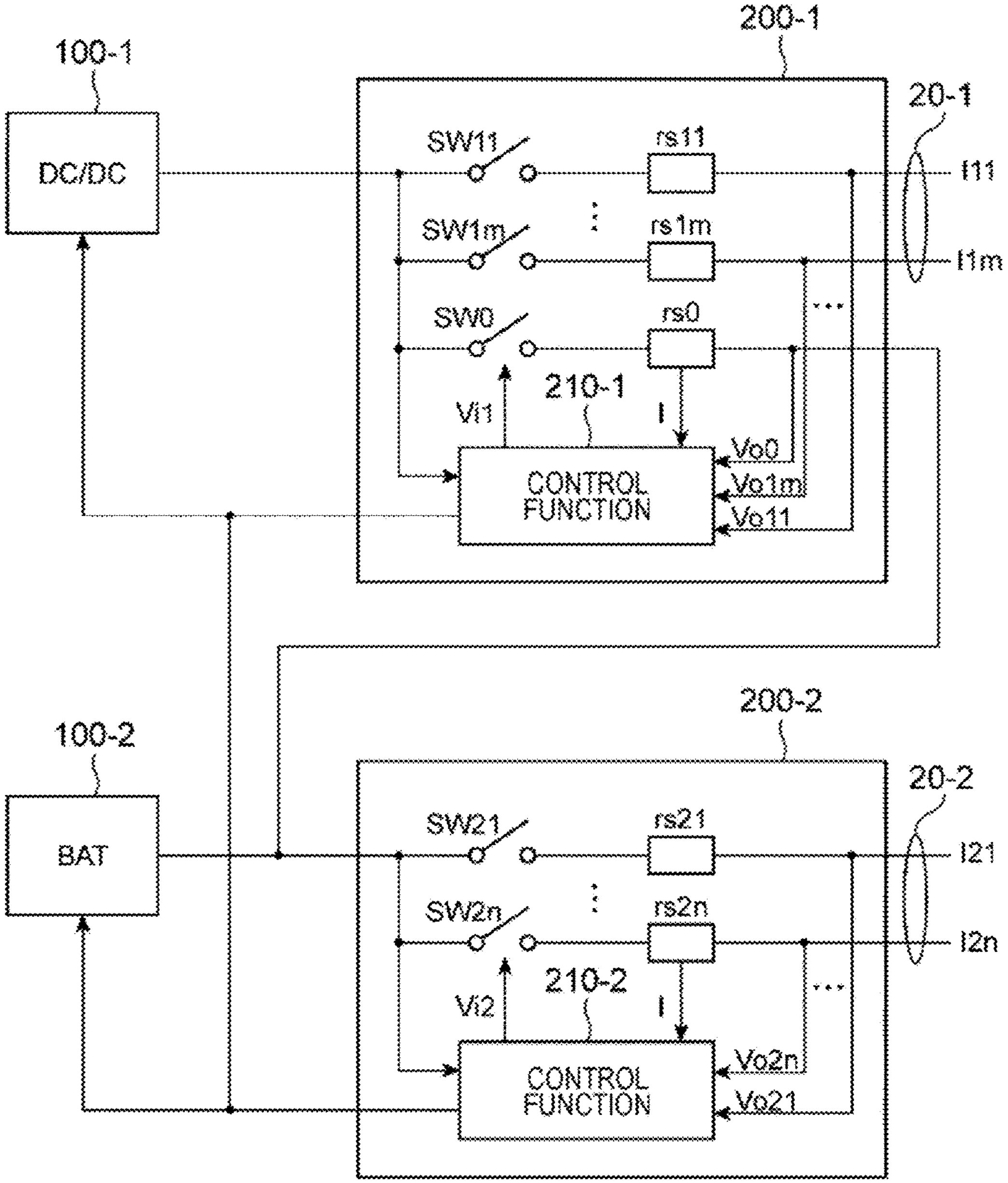
FIG. 15 is a diagram showing the configurations of the ECUs.

FIG. 15 is a diagram showing the configurations of the ECUs 200-1 and 200-2.

The ECU 200-1 supplies power from the power source 100-1 (power conversion device 101) to the first power supply path 20-1 via switches SW11 to SW1*m* and current sensors (shunt resistors) rs11 to rs1*m*. Furthermore, the ECU 200-1 supplies power from the power source 100-1 (power conversion device 101) to the ECU 200-2 via a switch SW0 and a current sensor (shunt resistor) rs0.

The ECU 200-1 has a control function 210-1. The control function 210-1 monitors the input voltage Vi1 and the output voltages Vo0 and Vo11 to Vo1*m*. Furthermore, the control function 210-1 monitors the output currents I0 and I11 to I1*m* using the current sensors (shunt resistors) rs0 and rs11 to rs1*m*. Then, the control function 210-1 opens (turns off) the switches SW11 to Sw1*m* and switch SW0 to cut off the current when there is an overvoltage (input voltage is higher than a threshold value), a voltage drop (input voltage is lower than a threshold value), or an overcurrent (output current is higher than a threshold value, output voltage is lower than a threshold value).

The ECU 200-2 supplies power from the power source 100-2 (secondary battery 102) and power from the ECU 200-1 to the second power supply path 20-2 via switches SW21 to SW2*n* and current sensors (shunt resistors) rs21 to rs2*n*.

The ECU 200-2 has a control function 210-2. The control function 210-2 monitors the input voltage Vi2 and the output voltages Vo21 to Vo2*n*. Furthermore, the control function 210-2 monitors the output currents I21 to I2*n* using the current sensors (shunt resistors) rs21 to rs2*n*. Then, the control function 210-2 opens (turns off) the switches SW21 to SW2*n* to cut off the current when there is an overvoltage (input voltage is higher than a threshold value), a voltage drop (input voltage is lower than a threshold value), or an overcurrent (output current is higher than a threshold value, output voltage is lower than a threshold value).

In addition, when the above-mentioned overvoltage, voltage drop, and overcurrent are not detected in either ECU 200-1 or ECU 200-2, the control function 210-1 of the ECU 200-1 closes (turns on) the switch SW0. The control function 210-1 can electrically connect the first power supply path 20-1 and the second power supply path 20-2 to charge the power source 100-2 (secondary battery 102) with power from the power source 100-1 (power conversion device 101).

When the above-mentioned overvoltage, voltage drop, or overcurrent is detected in either the ECU 200-1 or the ECU 200-2, the control function 210-1 opens (turns off) the switch SW0. The control function 210-1 can electrically disconnect the first power supply path 20-1 and the second power supply path 20-2 to operate each of them as an independent power supply path.

Ninth Embodiment

Figure 16:
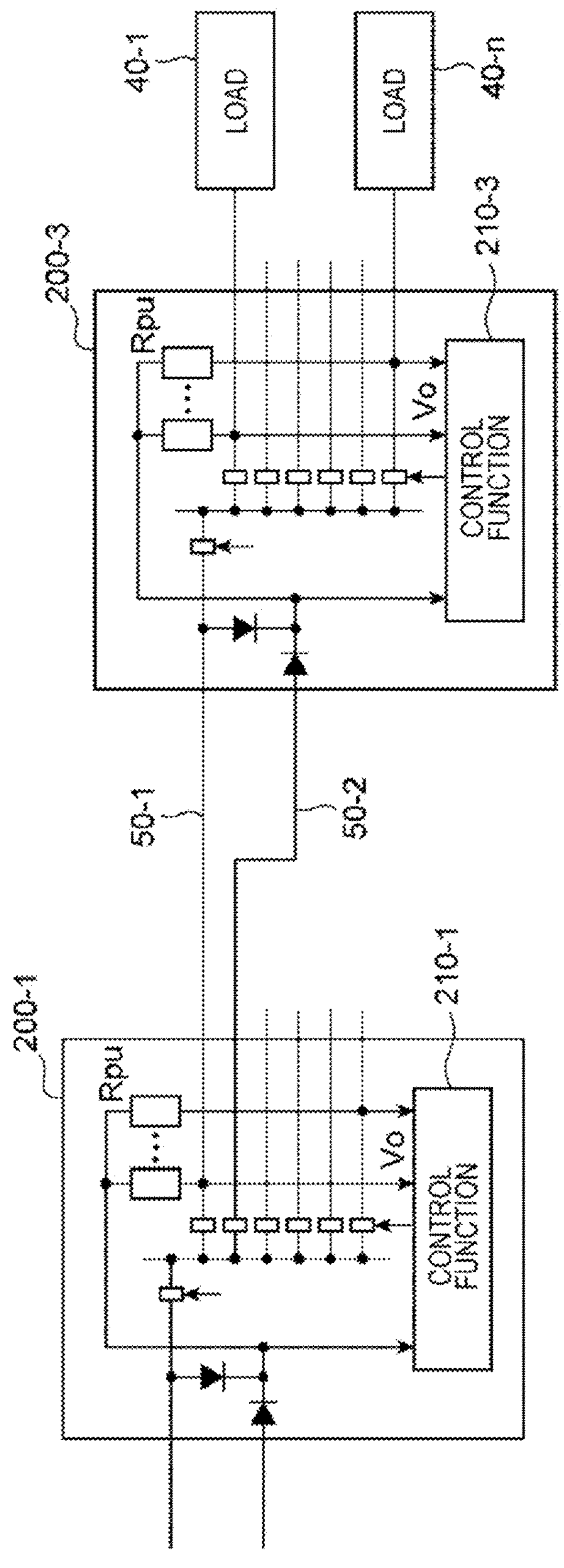
FIG. 16 is a diagram showing a connection example of power lines that supply power to a control function in the ECU.
Figure 17:
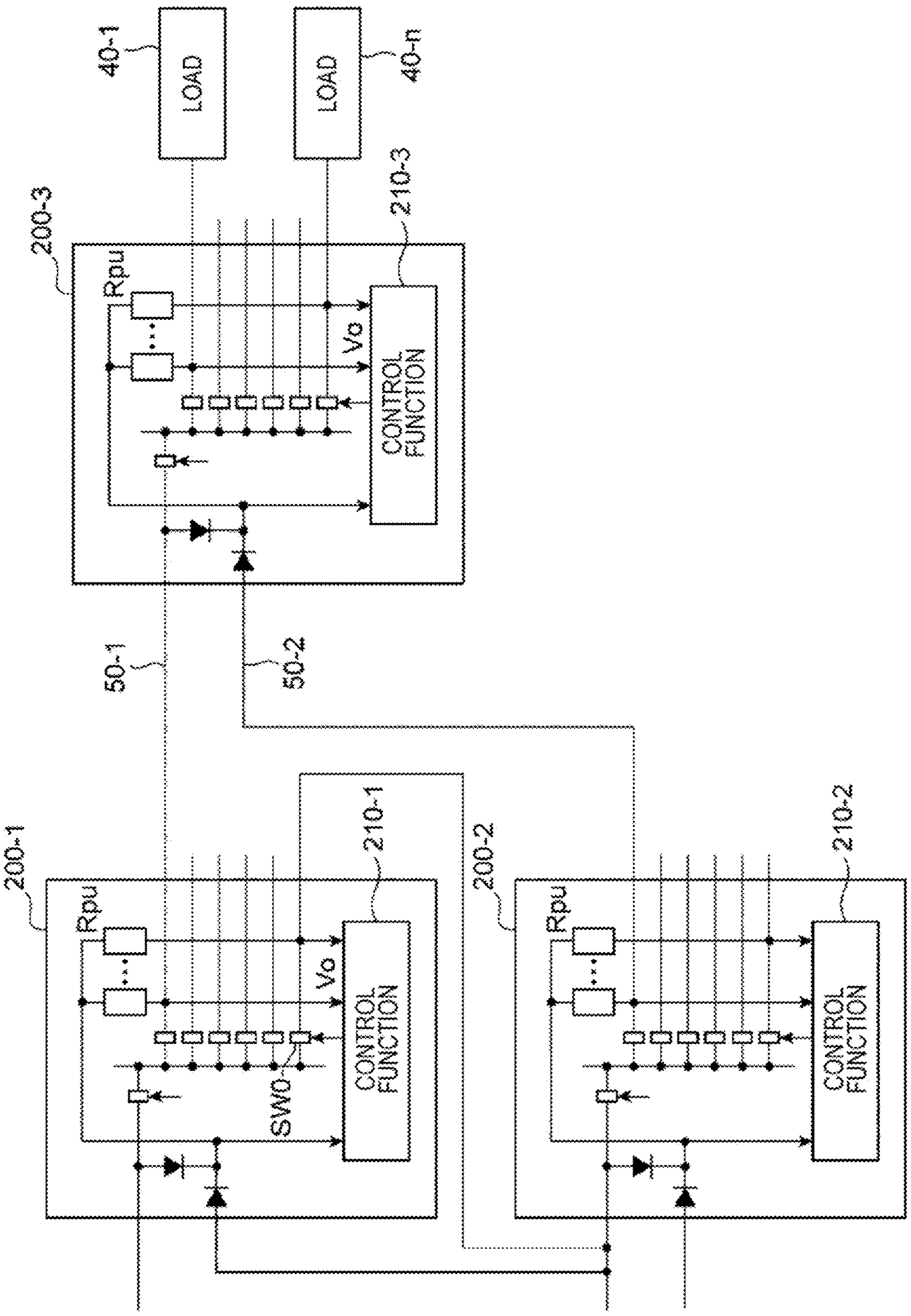
FIG. 17 is a diagram showing a connection example of power lines that supply power to a control function in the ECU.

FIG. 16 is a diagram showing a connection example of power lines 50-1 and 50-2 that supply power to a control function 210-3 in the ECU 200-3. FIG. 17 is a diagram showing a connection example of power lines 50-1 and 50-2 that supply power to a control function 210-3 in the ECU 200-3.

In FIG. 16, in order to supply power to loads 40-1 to 40-*n* connected to the ECU 200-3, in addition to a power line 50-1, a power line 50-2 is connected to a control function 210-3 in the ECU 200-3 through diodes OR. Furthermore, in addition to the power line 50-1, another power line 50-2 is connected through diodes OR to pull-up resistors Rpu connected to a power line through which output power flows from the ECU 200-3 to the loads 40-1 to 40-*n*. Each of the power line 50-1 and the power line 50-2 shown in FIG. 16 is a part of the first power supply path 20-1.

Accordingly, in the power supply network 1 of the ninth embodiment, even when an overcurrent or short circuit occurs in the loads 40-1 to 40-*n* and the power line 50-1 is cut off, the operation of the control function 210-3 can be continued by another power line 50-2. Therefore, in the power supply network 1 of the ninth embodiment, the control function 210-3 only needs to identify the load in which an overcurrent or short circuit has occurred among the loads 40-1 to 40-*n*, to cut off the switch SW to the load, and then to open the power line 50-1 again, and therefore it is possible to shorten the time required for recovery.

Furthermore, in the power supply network 1 of the ninth embodiment, in addition to the power line 50-1, another power line 50-2 supplies power to the pull-up resistors Rpu, so that a load in which an overcurrent or a short circuit has occurred can be identified more quickly. Therefore, the power supply network 1 of the ninth embodiment can further shorten the time required for recovery.

In addition, as shown in FIG. 17, the power line 50-2 may extend from the ECU 200-2 different from that of the power line 50-1, and be connected to the ECU 200-3. This makes it possible to prevent the power lines 50-1 and 50-2 from failing at the same time. The power line 50-1 shown in FIG. 17 is a part of the first power supply path 20-1, and the power line 50-2 shown in FIG. 17 is a part of the second power supply path 20-2.

Tenth Embodiment

Figure 18:
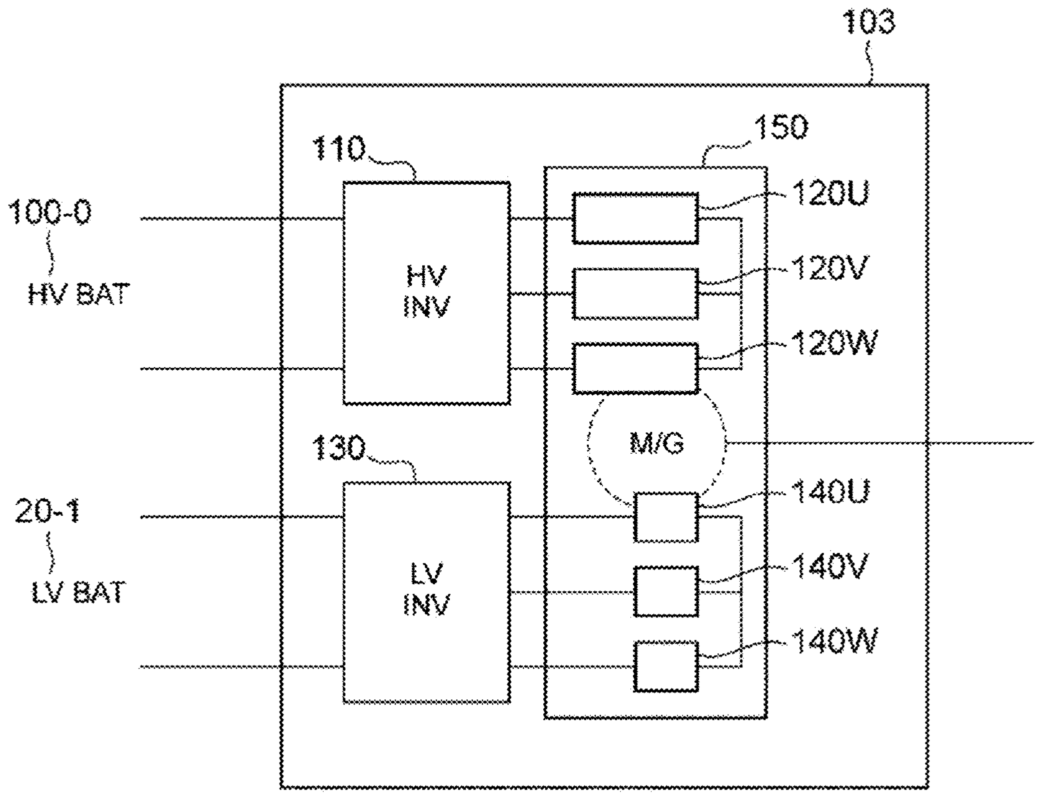
FIG. 18 is a diagram showing the configuration of the power conversion device.
Figure 19A:
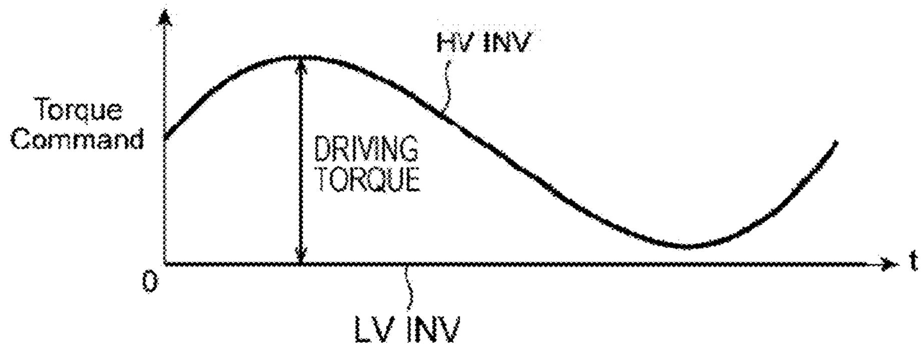
FIG. 19A is a diagram showing an operation example under normal conditions of the power conversion device shown in FIG. 18.
Figure 19B:
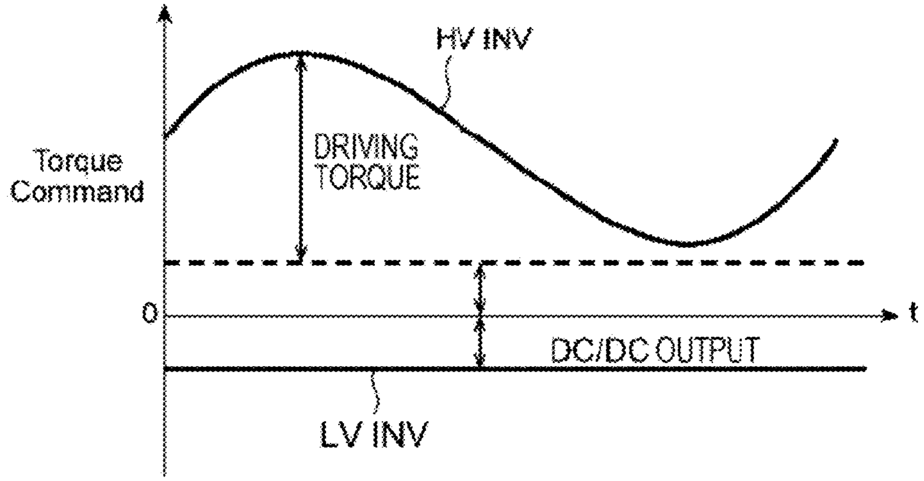
FIG. 19B is a diagram showing an operation example during the DC/DC operation of the power conversion device shown in FIG. 18.
Figure 19C:
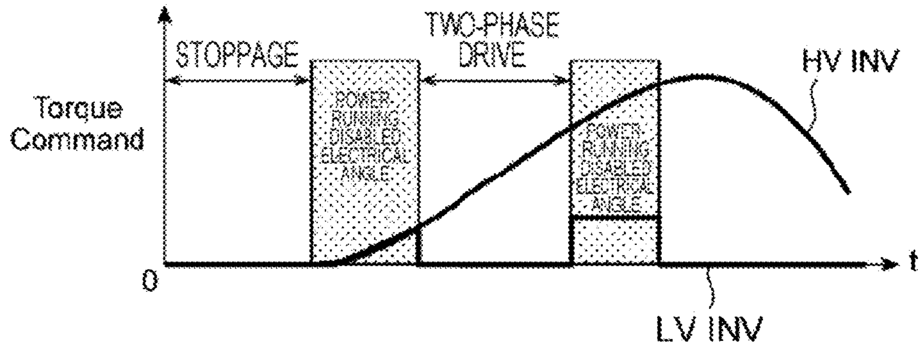
FIG. 19C is a diagram showing an operation example when one phase of the high-voltage inverter of the power conversion device shown in FIG. 18 fails.

FIG. 18 is a diagram showing the configuration of the power conversion device 103. FIG. 19(*a*) is a diagram showing an operation example under normal conditions of the power conversion device 103 shown in FIG. 18. FIG. 19(*b*) is a diagram showing an operation example during the DC/DC operation of the power conversion device 103 shown in FIG. 18. FIG. 19(*c*) is a diagram showing an operation example when one phase of the high-voltage inverter 110 of the power conversion device 103 shown in FIG. 18 fails.

The power supply network 1 of the tenth embodiment may include a power conversion device (DC/DC converter)

103 different from the power conversion device 101 shown in FIG. 1. The power conversion device 103 includes a high-voltage inverter (HV INV) 110 that is a first inverter connected to the main-machine drive power supply. Furthermore, the power conversion device 103 includes a low voltage inverter (LV INV) 130 that is a second inverter connected to the first power supply path 20-1 (or the second power supply path 20-2). Furthermore, the power conversion device 103 includes a motor 150. The motor 150 is mechanically connected to the drive wheels to rotate the drive wheels. The motor 150 includes the function of a generator.

The motor 150 has high-voltage windings 120U, 120V, and 120W that are first windings connected to the high-voltage inverter 110 that is the first inverter, and low-voltage windings 140U, 140V, and 140W that are second windings connected to the low-voltage inverter 130 that is the second inverter. The high-voltage windings 120U, 120V, and 120W and the low-voltage windings 140U, 140V, and 140W may be connected by a Y connection as shown in FIG. 18, or may be connected by a Delta connection. The high-voltage windings 120U, 120V, and 120W and the low-voltage windings 140U, 140V, and 140W have different numbers of turns depending on the applied voltage, but each is an insulated winding rather than a single-tapped winding.

The power conversion device 103 operates according to a torque command from a host control device of the power conversion device 103. The torque command is a control command that controls the operation of the power conversion device 103 so that a desired torque is output from the motor 150. The torque command includes a first torque command that is a control command for the high-voltage inverter 110 that is a first inverter, and a second torque command that is a control command for the low-voltage inverter 130 that is a second inverter. The power conversion device 103 operates in at least three operation modes, as shown in FIG. 19(*a*) to 19(*c*).

Under normal conditions, the power conversion device 103 operates as a main-machine drive power converter that converts DC power from the main-machine drive power supply 100-0 into AC power to drive the motor 150. Specifically, as shown in FIG. 19(*a*), the power conversion device 103 is given a first torque command instructing a predetermined torque (also referred to as a "driving torque") to be output by the motor 150 in order to rotate the drive wheels connected to the motor 150 at a predetermined rotation speed or with a predetermined torque. As shown in FIG. 19(*a*), the power conversion device 103 is not given the second torque command (alternatively, a second torque command instructing a torque value of zero is given). The high-voltage inverter 110 operates according to the first torque command and supplies AC power to the high-voltage windings 120U, 120V, and 120W to drive the motor 150. The low-voltage inverter 130 does not operate. Accordingly, in the power conversion device 103, only the high-voltage inverter 110 operates under normal conditions, and the motor 150 can be driven to output a predetermined torque. It should be noted that under normal conditions, the power conversion device 103 can perform the regenerative braking operation of the motor 150 when the vehicle decelerates.

During the DC/DC operation, the power conversion device 103 operates as a DC/DC converter that converts high voltage into low voltage using the high-voltage windings 120U, 120V, and 120W and the low-voltage windings 140U, 140V, and 140W of the motor 150. Specifically, a negative second torque command for regenerative braking of the motor 150 is given to the power conversion device 103 as shown in FIG. 19(*b*). Furthermore, a first torque command obtained by adding the amount corresponding to the second torque command to the predetermined torque to be output from the motor 150 is given to the power conversion device 103. The high-voltage inverter 110 operates according to the first torque command and supplies AC power to the high-voltage windings 120U, 120V, and 120W to drive the motor 150. The low-voltage inverter 130 operates according to the second torque command and recovers AC power from the low-voltage windings 140U, 140V, and 140W. The low-voltage inverter 130 converts the recovered AC power into DC power and supplies the DC power to the first power supply path 20-1 (or the second power supply path 20-2). Accordingly, the power conversion device 103 can use the power corresponding to the second torque command for power conversion from high voltage into low voltage while driving the motor 150 so as to output a predetermined torque.

When one phase of the high-voltage inverter 110 fails, the high-voltage inverter 110 cannot drive the motor 150 using only the other two normal phases depending on the electrical angle, and therefore the startup or power running of the motor 150 is disabled. In particular, when the motor 150 stops at an electrical angle at which the motor cannot be started, the high-voltage inverter 110 cannot start the motor 150.

When one phase of the high-voltage inverter 110 fails, the power conversion device 103 operates to drive the motor 150 by the low-voltage inverter 130 at a timing when an electrical angle within a range in which the motor 150 cannot be started or powered arrives. Specifically, as shown in FIG. 19(*c*), a first torque command instructing predetermined torque to be output from the motor 150 is given to the power conversion device 103. Furthermore, the power conversion device 103 is given a second torque command that instructs predetermined torque to be output by the motor 150 at a timing when an electrical angle in a range in which startup or power running is disabled arrives, and instructs a torque value of zero at a timing other than the timing. Accordingly, the power conversion device 103 can continue the startup or power-running operation of the motor 150 even when one phase of the high-voltage inverter 110 fails and an electrical angle in a range in which the startup or power running of the motor 150 is disabled arrives.

As described above, the power supply network 1 of the tenth embodiment can implement operation continuity in the event of a failure of the electric drive system including the motor 150. In particular, the power supply network 1 of the tenth embodiment can use the power conversion device 103 as a redundant power conversion device that addresses a failure of a normal DC/DC converter, as described with reference to FIG. 19(*b*) and FIG. 19(*c*). Accordingly, the power supply network 1 of the tenth embodiment can ensure not only the operation continuity when the electric drive system fails, but also the operation continuity when the power conversion device (DC/DC converter) fails. Therefore, the power supply network 1 of the tenth embodiment can implement redundancy of the power supply function with a simple configuration and ensure operation continuity in the event of a failure.

It should be noted that as a modification of the tenth embodiment, the low-voltage inverter 130 (second inverter) may be connected to the auxiliary-machine drive power supply through the second power supply path 20-2 (or the first power supply path 20-1). That is, the power conversion device 103 according to the modification of the tenth embodiment may include a high-voltage inverter 110 (first inverter) connected to a main-machine drive power supply, a low-voltage inverter 130 (second inverter) connected to an auxiliary-machine drive power supply, and a motor 150. Then, the power conversion device 103 according to the modification of the tenth embodiment may operate in the operation modes described above with reference to FIG. 19(*a*) to 19(*c*). Accordingly, also in the power supply network 1 according to the modification of the tenth embodiment, the power conversion device 103 can be used as a redundant power conversion device that addresses a failure of a normal DC/DC converter, and not only the operation continuity when the electric drive system fails, but also the operation continuity when the power conversion device (DC/DC converter) fails can be ensured. Therefore, the power supply network 1 according to the modification of the tenth embodiment can implement redundancy of the power supply function with a simple configuration and ensure operation continuity in the event of a failure.

Eleventh Embodiment

Figure 20:
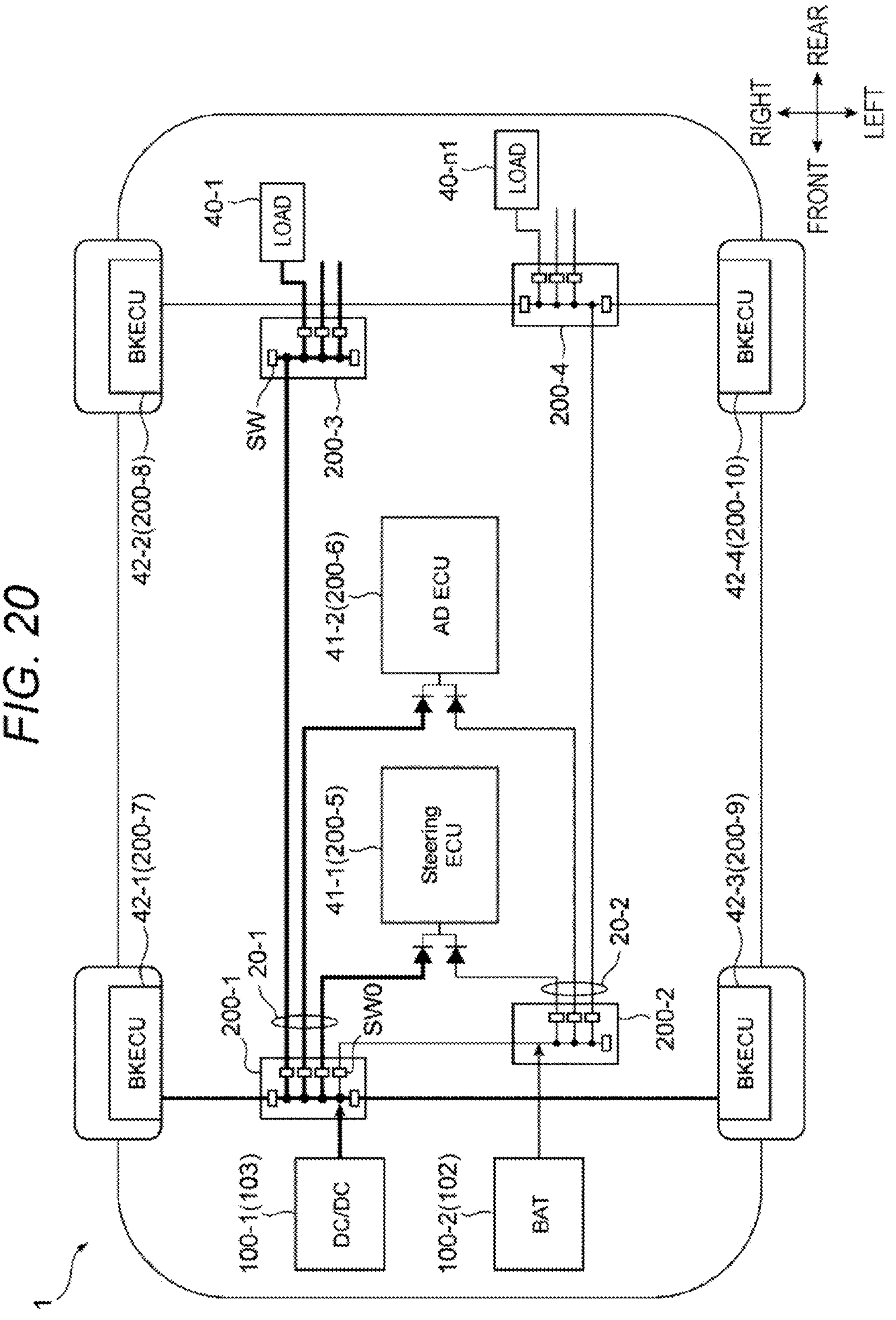
FIG. 20 is a diagram showing a power supply network including the power conversion device shown in FIG. 18 as a power source of the first power supply path.
Figure 21:
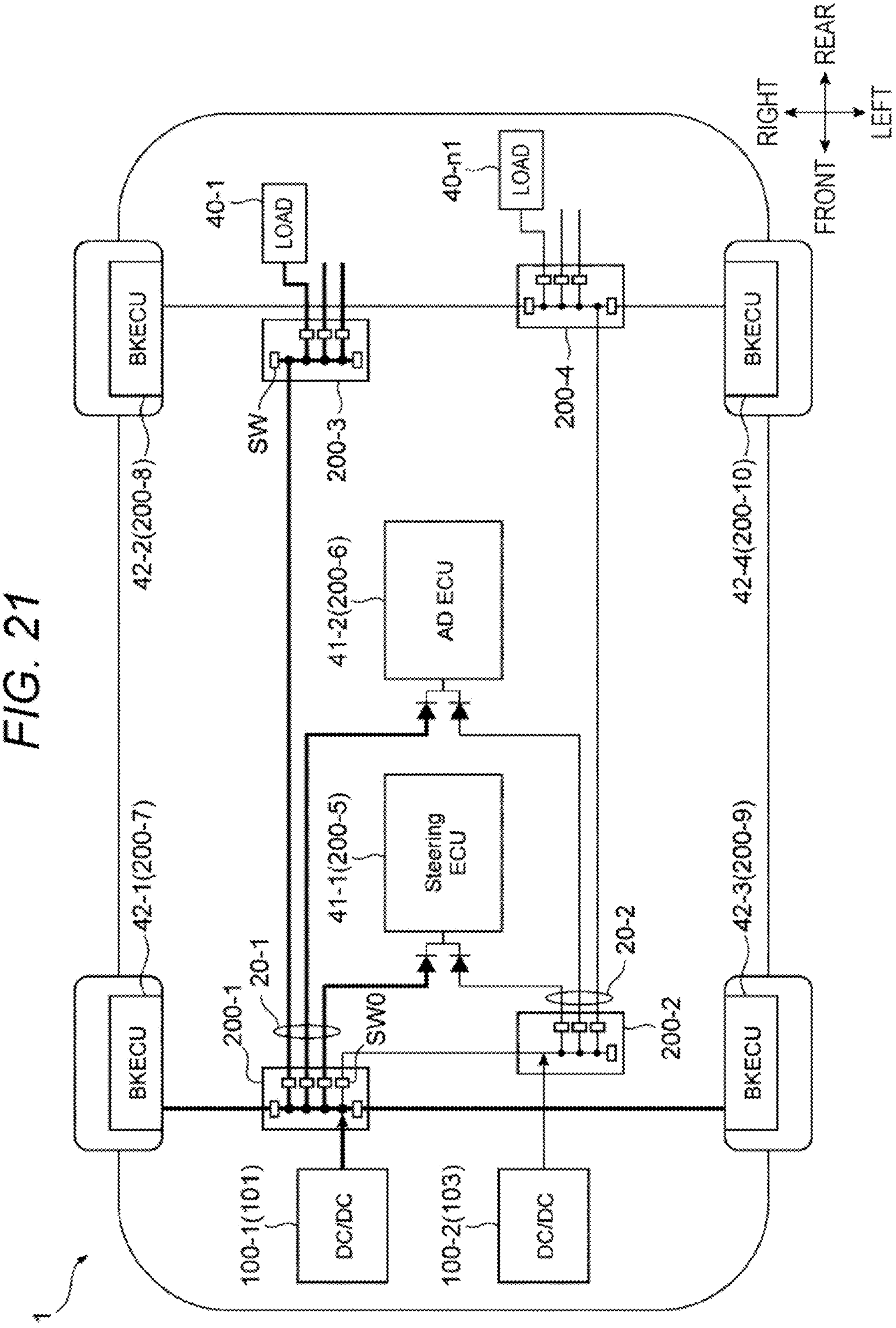
FIG. 21 is a diagram showing a power supply network including the power conversion device shown in FIG. 18 as a power source of the second power supply path.

FIG. 20 is a diagram showing a power supply network 1 including the power conversion device 103 shown in FIG. 18 as a power source 100-1 of the first power supply path 20-1. FIG. 21 is a diagram showing a power supply network 1 including the power conversion device 103 shown in FIG. 18 as a power source 100-2 of the second power supply path 20-2.

The power supply network 1 of the eleventh embodiment shown in FIG. 20 includes the power conversion device 103 shown in FIG. 18 instead of the normal power conversion device 101 included in the power supply network 1 of the fourth embodiment shown in FIG. 11. Accordingly, the power supply network 1 of the eleventh embodiment shown in FIG. 20 can eliminate the need for a normal power conversion device 101 and can ensure operation continuity when the electric drive system including the motor 150 fails.

The power supply network 1 of the eleventh embodiment shown in FIG. 21 includes the power conversion device 103 shown in FIG. 18 instead of the secondary battery 102 included in the power supply network 1 of the fourth embodiment shown in FIG. 11. Accordingly, in the power supply network 1 of the eleventh embodiment shown in FIG. 21, when the power supply paths 20-1 and 20-2 are abnormal, the first power supply path 20-1 uses the power conversion device 101 as the power source 100-1, and the second power supply path 20-2 uses the power conversion device 103 as the power source 100-2, and each can be operated as an independent redundant power supply path. Furthermore, since the power supply network 1 of the eleventh embodiment shown in FIG. 21 does not need to charge the secondary battery 102, the switch SW0 can be always open or can be unnecessary.

Twelfth Embodiment

Figure 22:
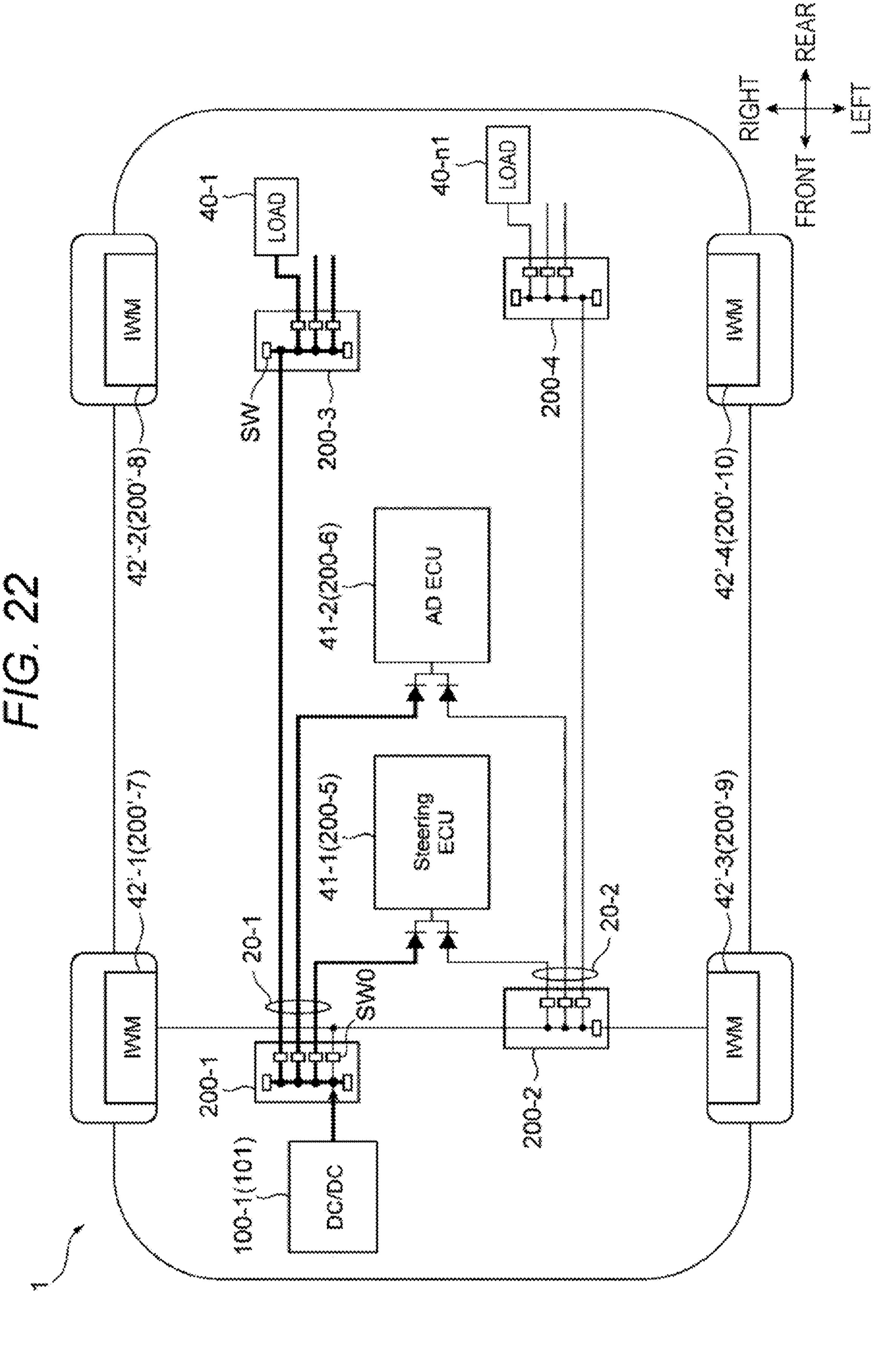
FIG. 22 is a diagram showing a power supply network in which some of the in-wheel motors are used as auxiliary-machine drive power sources.

FIG. 22 is a diagram showing a power supply network 1 in which some of the in-wheel motors are used as auxiliary-machine drive power sources.

In the power supply network 1 of the twelfth embodiment, when the auxiliary-machine drive power supply fails, some of the in-wheel motors are used as the backup auxiliary-machine drive power sources. However, from the standpoint of balance between the right and left of the driving torque, it is desirable to utilize in-wheel motors having the same number of wheels on the right and left as the auxiliary-machine drive power source.

In the power supply network 1 of the twelfth embodiment, some of the in-wheel motors are connected to the second power supply path 20-2 (or the first power supply path 20-1) that is connected to the auxiliary-machine drive power supply (for example, 12/24/36/48 V system). The other in-wheel motors are connected to the main-machine drive power supply (several hundred volts system).

In the power supply network 1 of the twelfth embodiment, when the auxiliary-machine drive power supply becomes abnormal while traveling, the following operation is performed. That is, to an in-wheel motor connected to the second power supply path 20-2 (or the first power supply path 20-1) connected to the auxiliary-machine drive power supply, a negative second torque command for regenerative braking of the in-wheel motor is given. The in-wheel motor connected to the auxiliary-machine drive power supply operates according to the second torque command. The in-wheel motor connected to the main-machine drive power supply is given a first torque command obtained by adding the amount corresponding to the second torque command to a predetermined torque. The in-wheel motor connected to the main-machine drive power supply operates according to the first torque command. Accordingly, the in-wheel motor connected to the second power supply path 20-2 (or the first power supply path 20-1) connected to the auxiliary-machine drive power supply can generate electric power by regenerative braking and supply the electric power to the second power supply path 20-2 (or the first power supply path 20-1).

Furthermore, more specifically with reference to FIG. 22, the front right in-wheel motor 200'-7 (critical load 42'-1) and the front left in-wheel motor 200'-9 (critical load 42'-3) are connected to the second power supply path 20-2. In the power supply network 1 of the twelfth embodiment shown in FIG. 22, when an abnormality occurs in the power supply paths 20-1 and 20-2, the first power supply path 20-1 uses the power conversion device 101 as the power source 100-1, the second power supply path 20-2 uses the front right in-wheel motor 200'-7 and the front left in-wheel motor 200'-9 as power sources, and each of the power supply paths can be operated as an independent redundant power supply path. Accordingly, the power supply network 1 of the twelfth embodiment can ensure operation continuity when the auxiliary-machine drive power supply fails. Therefore, the power supply network 1 of the twelfth embodiment can implement redundancy of the power supply function with a simple configuration and ensure operation continuity in the event of a failure.

It should be noted that in FIG. 22, the front right in-wheel motor 200'-7 (critical load 42'-1) and the front left in-wheel motor 200'-9 (critical load 42'-3) are connected to the second power supply path 20-2. However, the power supply network 1 of the twelfth embodiment can connect any in-wheel motor to the second power supply path 20-2 (or the first power supply path 20-1).

In addition, in the power supply network 1 of the tenth embodiment shown in FIG. 18, the high-voltage windings 120U, 120V, and 120W and the low-voltage windings 140U, 140V, and 140W are electromagnetically coupled, so that it is possible to supply power even when the vehicle is stopped (when the motor 150 is stationary). However, in the power supply network 1 of the twelfth embodiment, the in-wheel motor connected to the main-machine drive power supply and the in-wheel motor connected to the auxiliary-machine drive power supply are only mechanically coupled via the road surface, and therefore power cannot be supplied unless the vehicle travels. Therefore, in the power supply network 1 of the twelfth embodiment, it is also conceivable to use a secondary battery in combination in order to enable power to be supplied from the in-wheel motor connected to the auxiliary-machine drive power supply even when the vehicle is stopped.

In addition, in the power supply network 1 of the eleventh embodiment shown in FIG. 21 and the twelfth embodiment shown in FIG. 22, the secondary battery 102 can be made unnecessary as an auxiliary-machine drive power source. However, normally, the main-machine drive high-voltage secondary battery often opens the high-voltage contactor for safety when the vehicle is not in use, and closes the high-voltage contactor using the auxiliary-machine drive power supply when the vehicle is in use. In such a case, instead of the secondary battery 102 as the auxiliary-machine drive power source, a power supply that is smaller than the secondary battery 102 and can supply the power required to open and close the high-voltage contactor only needs to be prepared.

[Others]

It should be noted that the present invention is not limited to the embodiments described above, and includes various modifications. For example, the above-described embodiments are described in detail for easy understanding of the present invention, and are not necessarily limited to those including all the configurations described. In addition, a part of the configuration of one embodiment can be replaced with the configuration of another embodiment, and the configuration of another embodiment can be added to the configuration of one embodiment. In addition, it is possible to add, delete, and replace another configuration with respect to a part of the configuration of each of the embodiments.

In addition, each of the above-described configurations, functions, processing units, processing means, and the like may be partially or entirely implemented by hardware by, for example, designing with integrated circuits. In addition, each of the above-described configurations, functions, and the like may be implemented by software by interpreting and executing a program that implements each function by the processor. Information such as a program, a table, and a file for implementing each function can be stored in memory, a hard disk, a recording device such as a solid-state drive (SSD), or a recording medium such as an IC card, an SD card, or a DVD.

In addition, the control lines and the information lines indicate those which are considered necessary for the description, and do not necessarily indicate all the control lines and the information lines on the product. Actually, it can be considered that almost all components are connected to each other.

REFERENCE SIGNS LIST

1 power supply network
20-1 first power supply path
20-2 second power supply path
40-1 to 40-*n*2, 41-1, 41-2, 42-1 to 42-*n*+1, 42'-1 to 42'-*n*+1 load
100-0 main-machine drive power supply
101, 103 power conversion device
102 secondary battery
110 high-voltage inverter (first inverter)
120U, 120V, 120W high-voltage winding (first winding)
130 low-voltage inverter (second inverter)
140U, 140V, 140W low-voltage winding (second winding)
150 motor
200-5 steering ECU (steering device)
200-6 automated driving ECU (automated driving control device)
200-7 to 200-*m*+1 electric brake ECU (brake device)
200'-7 to 200'-*m*+1 in-wheel motor
SW0 switch

The invention claimed is:

1. A power supply network that is mounted on a vehicle and supplies power to a load from a plurality of power supply paths, the power supply network comprising:
- a first power supply path connected to a main-machine drive power supply of the vehicle through a power conversion device and connected to the load; and a second power supply path connected to a power source different from the main-machine drive power supply, connected to the load, and connected to the first power supply path through a switch, wherein
  - the switch is closed when the first power supply path and the second power supply path are normal, and is opened when the first power supply path or the second power supply path is abnormal,
  - the load comprises a first critical load and a second critical load, both the first power supply path and the second power supply path being connected to the first critical load, and
  - the second critical load including left-side loads and right-side loads, the first power supply path being connected to at least one left-side load and at least one right-side load among the second critical load and the second power supply path being connected to at least one different left-side load and at least one different right-side load among the second critical load.

2. The power supply network according to claim 1, wherein the first power supply path is connected to a brake device for at least one right wheel of the vehicle and a brake device for at least one left wheel of the vehicle, and the second power supply path is connected to a brake device for at least one different right wheel of the vehicle and a brake device for at least one different left wheel of the vehicle.

3. The power supply network according to claim 1, wherein the first power supply path is connected to an in-wheel motor for at least one right wheel of the vehicle and an in-wheel motor for at least one left wheel of the vehicle, and the second power supply path is connected to an in-wheel motor for at least one different right wheel of the vehicle and an in-wheel motor for at least one different left wheel of the vehicle.

4. The power supply network according to claim 1, wherein both the first power supply path and the second power supply path are connected to a steering device of the vehicle.

5. The power supply network according to claim 1, wherein both the first power supply path and the second power supply path are connected to an automated driving control device of the vehicle.

6. A power supply network that is mounted on a vehicle and supplies power to a load from a plurality of power supply paths, the power supply network comprising:
- a first power supply path connected to a main-machine drive power supply of the vehicle through a power conversion device and connected to the load; and
- a second power supply path connected to a power source different from the main machine drive power supply, connected to the load, and connected to the first power supply path through a switch,
  - wherein the switch is closed when the first power supply path and the second power supply path are normal, and is opened when the first power supply path or the second power supply path is abnormal, wherein the power conversion device includes:

a first inverter connected to the main-machine drive power supply;

a second inverter connected to the first power supply path;

a motor having a first winding connected to the first inverter and a second winding connected to the second inverter; and the second inverter operates according to a second torque command for regenerative braking of the motor, and the first inverter operates according to a first torque command obtained by adding an amount corresponding to the second torque command to a predetermined torque.

7. A power supply network that is mounted on a vehicle and supplies power to a load from a plurality of power supply paths, the power supply network comprising:

a first power supply path connected to a main-machine drive power supply of the vehicle through a power conversion device and connected to the load; and a second power supply path connected to a power source different from the main-machine drive power supply, connected to the load, and connected to the first power supply path through a switch, wherein the switch is closed when the first power supply path and the second power supply path are normal, and is opened when the first power supply path or the second power supply path is abnormal, wherein the vehicle includes an in-wheel motor connected to the main-machine drive power supply and an in-wheel motor connected to the second power supply path, wherein the in-wheel motor connected to the second power supply path operates according to a second torque command for regenerative braking of the in-wheel motor, and wherein the in-wheel motor connected to the main-machine drive power supply operates according to a first torque command obtained by adding an amount corresponding to the second torque command to a predetermined torque.

8. An electric vehicle mounted with the power supply network according to claim 6.

9. A power conversion device comprising:

a first inverter connected to a main-machine drive power supply of a vehicle;

a second inverter connected to an auxiliary-machine drive power supply of the vehicle; and a motor having a first winding connected to the first inverter and a second winding connected to the second inverter, wherein the second inverter operates according to a second torque command for regenerative braking of the motor, and the first inverter operates according to a first torque command obtained by adding an amount corresponding to the second torque command to a predetermined torque.

* * * * *